US011151623B2

(12) United States Patent
Ahmed et al.

(10) Patent No.: US 11,151,623 B2
(45) Date of Patent: Oct. 19, 2021

(54) PEER-TO-PEER TRADING PLATFORM

(71) Applicant: eBay Inc., San Jose, CA (US)

(72) Inventors: Zahid N. Ahmed, San Jose, CA (US); Adrian Nicholas Cockcroft, Los Gatos, CA (US); Josep M. Ferrandiz, Palo Alto, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/223,526

(22) Filed: Dec. 18, 2018

(65) Prior Publication Data

US 2019/0172109 A1    Jun. 6, 2019

Related U.S. Application Data

(63) Continuation of application No. 15/817,902, filed on Nov. 20, 2017, now Pat. No. 10,192,249, which is a
(Continued)

(51) Int. Cl.
*G06F 13/00* (2006.01)
*G06Q 30/06* (2012.01)
(Continued)

(52) U.S. Cl.
CPC ..... *G06Q 30/0601* (2013.01); *G06F 16/1834* (2019.01); *G06Q 20/223* (2013.01);
(Continued)

(58) Field of Classification Search
CPC .. G06Q 30/0601; G06Q 20/223; G06Q 30/08; G06Q 30/06; G06F 17/30206; G06F 16/1834; H04L 67/104; H04L 67/1061
(Continued)

(56) References Cited

U.S. PATENT DOCUMENTS

| 6,029,161 A | 2/2000 | Lang et al. |
| 6,102,287 A | 8/2000 | Matyas, Jr. |

(Continued)

FOREIGN PATENT DOCUMENTS

| WO | 2001/006439 A1 | 1/2001 |
| WO | 2007/108986 A2 | 9/2007 |

(Continued)

OTHER PUBLICATIONS

Response to Non-Final Office Action filed on Apr. 28, 2017, for U.S. Appl. No. 14/611,547, dated Feb. 7, 2017, 19 pages.
(Continued)

*Primary Examiner* — Kenneth R Coulter
(74) *Attorney, Agent, or Firm* — Schwegman Lundberg & Woessner, P.A.

(57) ABSTRACT

A computer-implemented method and system is disclosed in which a network-based interaction environment includes a plurality of peer-to-peer nodes being able to communicate directly with each other using a peer-to-peer protocol and a peer-to-peer client application, and a first peer-to-peer client application to maintain persistent item information on at least one peer-to-peer node of the plurality of peer-to-peer nodes, the persistent information being related to an item being offered by a first user of the first peer-to-peer client application.

19 Claims, 26 Drawing Sheets

Related U.S. Application Data continuation of application No. 14/611,547, filed on Feb. 2, 2015, now Pat. No. 9,846,900, which is a continuation of application No. 11/646,711, filed on Dec. 28, 2006, now Pat. No. 8,949,338.

(60) Provisional application No. 60/743,466, filed on Mar. 13, 2006.

(51) Int. Cl.
*G06Q 20/22* (2012.01)
*H04L 29/08* (2006.01)
*G06Q 30/08* (2012.01)
*G06F 16/182* (2019.01)

(52) U.S. Cl.
CPC ............ *G06Q 30/06* (2013.01); *G06Q 30/08* (2013.01); *H04L 67/104* (2013.01); *H04L 67/1061* (2013.01)

(58) Field of Classification Search
USPC ......... 709/204–206, 243, 201; 707/770, 769, 707/758, 754, 622; 705/26.1, 26.61, 705/26.62
See application file for complete search history.

(56) References Cited

U.S. PATENT DOCUMENTS

| | | | |
|---|---|---|---|
| 6,189,103 | B1 | 2/2001 | Nevarez et al. |
| 6,446,113 | B1 | 9/2002 | Ozzie et al. |
| 6,636,854 | B2 | 10/2003 | Dutta et al. |
| 6,704,716 | B1 | 3/2004 | Force |
| 6,915,138 | B2 | 7/2005 | Kraft |
| 7,039,701 | B2 | 5/2006 | Wesley |
| 7,127,613 | B2 | 10/2006 | Pabla et al. |
| 7,181,438 | B1 | 2/2007 | Szabo |
| 7,203,753 | B2 | 4/2007 | Yeager et al. |
| 7,328,243 | B2 | 2/2008 | Yeager et al. |
| 7,424,717 | B2 * | 9/2008 | Blevins ................... G06Q 10/06 719/318 |
| 7,627,631 | B2 * | 12/2009 | Blevins ................... G06F 9/546 709/205 |
| 7,877,353 | B2 | 1/2011 | Ahmed et al. |
| 7,958,019 | B2 | 6/2011 | Ahmed et al. |
| 8,160,928 | B2 | 4/2012 | Vonbergen et al. |
| 8,335,822 | B2 | 12/2012 | Ahmed et al. |
| 8,949,338 | B2 | 2/2015 | Ahmed et al. |
| 9,846,900 | B2 | 12/2017 | Ahmed et al. |
| 10,192,249 | B2 | 1/2019 | Ahmed et al. |
| 2002/0002530 | A1 | 1/2002 | May |
| 2002/0073075 | A1 | 6/2002 | Dutta et al. |
| 2002/0073204 | A1 | 6/2002 | Dutta et al. |
| 2002/0099787 | A1 | 7/2002 | Bonner et al. |
| 2002/0120582 | A1 | 8/2002 | Elston et al. |
| 2002/0123938 | A1 | 9/2002 | Yu et al. |
| 2002/0138402 | A1 | 9/2002 | Zacharia et al. |
| 2002/0152123 | A1 | 10/2002 | Giordano et al. |
| 2002/0182421 | A1 | 12/2002 | Tixhon |
| 2002/0188527 | A1 | 12/2002 | Dillard et al. |
| 2003/0018566 | A1 | 1/2003 | Mackay et al. |
| 2003/0055898 | A1 | 3/2003 | Yeager et al. |
| 2003/0061111 | A1 | 3/2003 | Dutta et al. |
| 2003/0061287 | A1 | 3/2003 | Yu et al. |
| 2003/0070070 | A1 | 4/2003 | Yeager et al. |
| 2003/0084170 | A1 | 5/2003 | De Jong et al. |
| 2003/0088544 | A1 | 5/2003 | Kan et al. |
| 2003/0101267 | A1 | 5/2003 | Thompson et al. |
| 2003/0120734 | A1 | 6/2003 | Kagan et al. |
| 2003/0154164 | A1 | 8/2003 | Mascavage et al. |
| 2003/0158839 | A1 | 8/2003 | Faybishenko et al. |
| 2003/0163729 | A1 | 8/2003 | Buchegger |
| 2003/0182421 | A1 | 9/2003 | Faybishenko et al. |
| 2003/0187974 | A1 | 10/2003 | Burbeck et al. |
| 2003/0212632 | A1 * | 11/2003 | Keogh ................... G06Q 20/02 705/40 |
| 2003/0216996 | A1 | 11/2003 | Cummings et al. |
| 2003/0236752 | A1 | 12/2003 | Dawson et al. |
| 2004/0019564 | A1 | 1/2004 | Goldthwaite et al. |
| 2004/0034568 | A1 | 2/2004 | Sone |
| 2004/0039916 | A1 * | 2/2004 | Aldis ..................... G06F 21/10 713/177 |
| 2004/0064512 | A1 | 4/2004 | Arora et al. |
| 2004/0068462 | A1 * | 4/2004 | Katz ..................... G06Q 30/08 705/37 |
| 2004/0068728 | A1 * | 4/2004 | Blevins ................... G06F 9/546 718/100 |
| 2004/0088369 | A1 | 5/2004 | Yeager et al. |
| 2004/0139015 | A1 | 7/2004 | Luttge |
| 2004/0224772 | A1 | 11/2004 | Canessa et al. |
| 2004/0230536 | A1 | 11/2004 | Fung et al. |
| 2005/0010483 | A1 | 1/2005 | Ling |
| 2005/0033683 | A1 | 2/2005 | Sacco et al. |
| 2005/0120133 | A1 | 6/2005 | Slack-Smith |
| 2005/0132060 | A1 | 6/2005 | Mo et al. |
| 2005/0185624 | A1 | 8/2005 | Andersen et al. |
| 2005/0192893 | A1 | 9/2005 | Keeling et al. |
| 2005/0216559 | A1 | 9/2005 | Manion et al. |
| 2005/0289039 | A1 | 12/2005 | Greak |
| 2005/0289081 | A1 | 12/2005 | Sporny |
| 2006/0020662 | A1 | 1/2006 | Robinson |
| 2006/0074780 | A1 | 4/2006 | Taylor et al. |
| 2006/0090067 | A1 | 4/2006 | Edmonds et al. |
| 2006/0212542 | A1 | 9/2006 | Fang |
| 2006/0212584 | A1 | 9/2006 | Yu et al. |
| 2006/0212595 | A1 | 9/2006 | Chen et al. |
| 2006/0230107 | A1 | 10/2006 | Yu et al. |
| 2006/0253458 | A1 | 11/2006 | Dixon et al. |
| 2006/0294189 | A1 | 12/2006 | Natarajan et al. |
| 2007/0011104 | A1 | 1/2007 | Leger et al. |
| 2007/0073837 | A1 | 3/2007 | Johnson-Mccormick et al. |
| 2007/0124312 | A1 | 5/2007 | Simpson et al. |
| 2007/0156677 | A1 | 7/2007 | Szabo |
| 2007/0180078 | A1 | 8/2007 | Murphy et al. |
| 2007/0198426 | A1 | 8/2007 | Yates |
| 2007/0211651 | A1 | 9/2007 | Ahmed et al. |
| 2007/0214249 | A1 | 9/2007 | Ahmed et al. |
| 2007/0214250 | A1 | 9/2007 | Ahmed et al. |
| 2007/0214259 | A1 | 9/2007 | Ahmed et al. |
| 2007/0282962 | A1 | 12/2007 | Kim et al. |
| 2008/0034108 | A1 | 2/2008 | Chapweske |
| 2008/0175220 | A1 | 7/2008 | Anderson et al. |
| 2009/0106152 | A1 | 4/2009 | Dill et al. |
| 2010/0042538 | A1 | 2/2010 | Dheer et al. |
| 2010/0250687 | A1 | 9/2010 | Smith et al. |
| 2013/0325646 | A1 | 12/2013 | Hamor |
| 2014/0058939 | A1 | 2/2014 | Savla |
| 2015/0149555 | A1 | 5/2015 | Ahmed et al. |
| 2018/0075501 | A1 | 3/2018 | Ahmed et al. |

FOREIGN PATENT DOCUMENTS

| | | |
|---|---|---|
| WO | 2007/108986 A3 | 11/2007 |
| WO | 2008/033551 A2 | 3/2008 |
| WO | 2008/033551 A3 | 11/2008 |
| WO | 2014/031866 A2 | 2/2014 |
| WO | 2014/031866 A3 | 4/2014 |

OTHER PUBLICATIONS

Corrected Notice of Allowability received for U.S. Appl. No. 15/817,902, dated Sep. 28, 2018, 4 pages.
Examiner-Initiated Interview Summary received for U.S. Appl. No. 15/817,902, dated Sep. 28, 2018, 1 page.
First Action Interview—Pre-Interview Communication received for U.S. Appl. No. 15/817,902, dated Jun. 14, 2018, 4 pages.
Notice of Allowance received for U.S. Appl. No. 15/817,902, dated Sep. 11, 2018, 5 Pages.
Response to First Action Interview—Pre Interview Communication filed on Jul. 9, 2018, for U.S. Appl. No. 15/817,902 , dated Jun. 14, 2018, 8 pages.

(56) References Cited

OTHER PUBLICATIONS

Preliminary Amendment filed on Nov. 20, 2017, for U.S. Appl. No. 15/817,902, 8 pages.
Response to Final Office Action filed on Jun. 25, 2014, for U.S. Appl. No. 13/594,472, dated Mar. 11, 2015, 9 Pages.
Response to Final Office Action filed on Feb. 17, 2015, for U.S. Appl. No. 13/594,472, dated Nov. 17, 2014, 14 Pages.
Response to Non-Final Office Action filed on Apr. 15, 2014, for U.S. Appl. No. 13/594,472, dated Jan. 17, 2014, 12 Pages.
Response to Non-Final Office Action filed on Jun. 11, 2015, for U.S. Appl. No. 13/594,472, dated Mar. 11, 2015, 22 Pages.
Response to Non-Final Office Action filed on Oct. 22, 2014, for U.S. Appl. No. 13/594,472, dated Jul. 23, 2014, 12 Pages.
Examiner Initiated Interview for U.S. Appl. No. 13/594,472, dated Sep. 17, 2014, 3 Pages.
Non-Final Office Action received for U.S. Appl. No. 13/594,472, dated Jan. 17, 2014, 12 Pages.
Selcuk, et al., "A Reputation-Based Trust Management System for P2P Networks" IEEE International Symposium on, Apr. 19-22, 2004, pp. 251-258.
First Action Interview—Pre-Interview Communication received for U.S. Appl. No. 14/611,547, dated Aug. 12, 2016, 4 Pages.
Non-Final Office Action received for U.S. Appl. No. 14/611,547, dated Feb. 7, 2017, 16 Pages.
Notice of Allowance received for U.S. Appl. No. 14/611,547, dated Aug. 15, 2017, 7 Pages.
Preliminary Amendment filed on Apr. 13, 2015 for U.S. Appl. No. 14/611,547, 7 Pages.
Response to First Action Interview—Pre-Interview Communication filed on Oct. 12, 2016, for U.S. Appl. No. 14/611,547, dated Aug. 12, 2016, 13 Pages.
Damiani, et al., "A Reputation-Based Approach for Choosing Reliable Resources in Peer-To-Peer Networks", conference on Computer and Communications Security, proceedings of the ACM conference on Computer and communications security, Nov. 18-22, 2002, pp. 207-216.
International Written Opinion received for PCT Patent Application No. PCT/US2013/056212, dated Feb. 10, 2014, 6 Pages.
International Search Report received for PCT Patent Application No. PCT/US2013/056212, dated Feb. 10, 2014, 4 Pages.
International Written Opinion received for PCT Patent Application No. PCT/US2007/20109, dated Sep. 4, 2008, 3 Pages.
International Search Report for PCT Patent Application No. PCT/US2007/20109, dated Sep. 4, 2008, 2 Pages.
International Preliminary Report on Patentability received for PCT Patent Application No. PCT/US2007/20109, dated Mar. 26, 2009, 7 Pages.
International Preliminary Report on Patentability received for PCT Application No. PCT/US2007/006180, dated Sep. 25, 2008, 7 Pages.
International Search Report received for PCT Application No. PCT/US2007/006180, dated Oct. 2, 2007, 2 Pages.
amazon.com, Retrieved from the Internet URL :<http://www.amazon.com/exec/obidos/subst/home/home.html/ref=two_tab_hp/?, Accessed on Dec. 5, 2005, 2 pages.
amazon.com, "Auctions Listings Glossary", Retrieved from the Internet URL :<http://www.amazon.com/exec/obidos/tg/browse/-/1161360>, Accessed on Sep. 9, 2004, 5 pages.
amazon.com, "Online Shopping for Electronics, Apparel, Computers, Books, DVDs & more", Retrieved from the Internet URL :<https://web.archive.org/web/20051205111403/http://www.amazon.com/exec/obidos/subst/home/home.html/ref=two_tab_hp/>, Accessed on Dec. 5, 2005, 3 pages.
amazon.com, "Sell Your Stuff", Retrieved from the Internet URL :<https://web.archive.org/web/20051212112732/http://www.amazon.com/exec/obidos/subst/misc/sell-your-stuff.html/ref=ss_m_/>, Accessed on Dec. 12, 2005, 1 page.
amazon.com, "Sign in", Retrieved from the Internet URL :<http://zme.amazon.com/exec/varzea/register/login/?pipeline-type=payee&pipeline-return-directly=1&pipeline-return-handler=subst/your-account/manage-your-seller-account.html&pipeline-return-handler-type=get>, Accessed on Jul. 15, 2005, 1 page.
amazon.com, "Your Auctions & zShops Account", Retrieved from the Internet URL : <http://s1.amazon.com/exec/varzea/subst/your-account>, Accessed on Nov. 9, 2004, 2 pages.
U.S. Appl. No. 11/646,711 U.S. Pat. No. 8,949,338, filed Dec. 28, 2006, Peer-To-Peer Trading Platform.
U.S. Appl. No. 14/611,547 U.S. Pat. No. 9,846,900, filed Feb. 2, 2015, Peer-To-Peer Trading Platform.
U.S. Appl. No. 15/817,902 U.S. Pat. No. 10,192,249, filed Nov. 20, 2017, Peer-To-Peer Trading Platform.
U.S. Appl. No. 11/646,717 U.S. Pat. No. 8,335,822, filed Dec. 28, 2006, Peer-To-Peer Trading Platform With Search Caching.
U.S. Appl. No. 11/646,823 U.S. Pat. No. 7,958,019, filed Dec. 28, 2006, Peer-To-Peer Trading Platform With Roles-Based Transactions.
U.S. Appl. No. 11/646,934 U.S. Pat. No. 7,877,353, filed Dec. 28, 2006, Peer-To-Peer Trading Platform With Relative Reputation-Based Item Search and Buddy Rating.
Applicant Initiated Interview Summary received for U.S. Appl. No. 11/521,997, dated Aug. 31, 2015, 3 Pages.
Applicant Initiated Interview Summary received for U.S. Appl. No. 11/521,997, dated Feb. 20, 2015, 3 Pages.
Applicant Initiated Interview Summary received for U.S. Appl. No. 11/521,997, dated Jan. 26, 2015, 3 pages.
Final Office Action received for U.S. Appl. No. 11/521,997, dated Jun. 1, 2015, 11 Pages.
Non-Final Office Action received for U.S. Appl. No. 11/521,997, dated Aug. 11, 2009, 18 Pages.
Response to Final Office Action filed on Sep. 1, 2015, for U.S. Appl. No. 11/521,997, dated Jun. 1, 2015, 17 Pages.
Non-Final Office Action received for U.S. Appl. No. 131594,472, dated Mar. 11, 2015, 21 Pages.
Response to Non- Final Office Action filed on Feb. 11, 2010, for U.S. Appl. No. 11/521,997, dated Aug. 11, 2009, 8 Pages.
Response to Restriction Requirement filed on Jun. 19, 2009, for U.S. Appl. No. 11/521,997, dated Mar. 19, 2009, 5 Pages.
Non-Final Office Action received for U.S. Appl. No. 11/646,823, dated Jun. 24, 2010, 18 Pages.
Restriction Requirement received for U.S. Appl. No. 11/521,997, dated Mar. 19, 2009, 6 Pages.
Final Office Action received for U.S. Appl. No. 11/646,711, dated Jul. 8, 2010, 8 Pages.
Final Office Action received for U.S. Appl. No. 11/646,711, dated May 8, 2009, 9 Pages.
Non-Final Office Action received for U.S. Appl. No. 11/646,711, dated Nov. 30, 2009, 7 Pages.
Non-Final Office Action received for U.S. Appl. No. 11/646,711, dated Sep. 13, 2013, 7 Pages.
Non-Final Office Action received for U.S. Appl. No. 11/646,711, dated Oct. 6, 2008, 8 Pages.
Notice of Allowance received for U.S. Appl. No. 11/646,711, dated May 27, 2014, 5 Pages.
Notice of Allowance received for U.S. Appl. No. 11/646,711, dated Sep. 30, 2014, 5 Pages.
Preliminary Amendment for U.S. Appl. No. 11/646,711, filed Jul. 31, 2008, 6 Pages.
Response to Final Office Action filed on Nov. 8, 2010, for U.S. Appl. No. 11/646,711, dated Jul. 8, 2010, 11 Pages.
Response to Final Office Action filed on Sep. 8, 2009 for U.S. Appl. No. 11/646,711, dated May 8, 2009, 11 Pages.
Response to Non-Final Office Action filed on Jan. 6, 2009 for U.S. Appl. No. 11/646,711, dated Oct. 6, 2008, 11 Pages.
Response to Non-Final Office Action filed on Jan. 13, 2014 for U.S. Appl. No. 11/646,711, dated Sep. 13, 2013, 9 Pages.
Response to Non-Final Office Action filed on Mar. 30, 2010 , for U.S. Appl. No. 11/646,711, dated Nov. 30, 2009, 13 Pages.
Final Office Action received for U.S. Appl. No. 11/646,717, dated Aug. 17, 2011, 15 Pages.
Final Office Action received for U.S. Appl. No. 11/646,717, dated Feb. 4, 2010, 15 Pages.
Non-Final Office Action received for U.S. Appl. No. 11/646,717, dated Aug. 18, 2009, 11 Pages.

(56) References Cited

OTHER PUBLICATIONS

Non-Final Office Action received for U.S. Appl. No. 11/646,717, dated Mar. 24, 2011, 13 Pages.
Notice of Allowance received for U.S. Appl. No. 11/646,717, dated Aug. 15, 2012, 10 Pages.
Response to Final Office Action filed on Dec. 16, 2011 for U.S. Appl. No. 11/646,717, dated Aug. 17, 2011, 12 Pages.
Response to Final Office Action filed on Jul. 6, 2010 for U.S. Appl. No. 11/646,717, dated Feb. 4, 2010, 11 Pages.
Response to Non-Final Office Action filed on Jul. 25, 2011 for U.S. Appl. No. 11/646,717, dated Mar. 24, 2011, 14 Pages.
Response to Non-Final Office Action filed on Nov. 18, 2009 for U.S. Appl. No. 11/646,717, dated Aug. 18, 2009, 12 Pages.
Notice of Allowance received for U.S. Appl. No. 11/646,823, dated Jan. 28, 2011, 17 Pages.
Response to Non-Final Office Action filed on Oct. 25, 2010 for U.S. Appl. No. 11/646,823, dated Jun. 24, 2010, 13 Pages.
Final Office Action received for U.S. Appl. No. 11/646,934, dated Nov. 17, 2009, 20 Pages.
Final Office Action received for U.S. Appl. No. 11/646,934, dated Jun. 2, 2009, 17 Pages.
Non-Final Office Action received for U.S. Appl. No. 11/646,934, dated Nov. 14, 2008, 16 Pages.
Non-Final Office Action received for U.S. Appl. No. 11/646,934, dated Mar. 8, 2010, 19 Pages.
Notice of Allowance received for U.S. Appl. No. 11/646,934, dated Sep. 7, 2010, 8 Pages.
Response to Final Office Action filed on Feb. 17, 2010 for U.S. Appl. No. 11/646,934, dated Nov. 17, 2009, 12 Pages.
Response to Final Office Action filed on Jul. 8, 2010, for U.S. Appl. No. 11/646,934, dated Mar. 38, 2010, 11 Pages.
Response to Final Office Action filed on Sep. 2, 2009 for U.S. Appl. No. 11/646,934, dated Jun. 2, 2009, 11 Pages.
Response to Non-Final Office Action filed on Feb. 17, 2009 for U.S. Appl. No. 11/646,934, dated Nov. 14, 2008, 13 Pages.
Applicant Initiated Interview Summary for U.S. Appl. No. 13/594,472, dated Dec. 26, 2014, 5 pages.
Applicant Initiated Interview Summary received for U.S. Appl. No. 13/594,472, dated Apr. 18, 2014, 3 Pages.
Final Office Action received for U.S. Appl. No. 13/594,472, dated May 20, 2014, 20 Pages.
Final Office Action received for U.S. Appl. No. 13/594,472, dated Nov. 17, 2014, 23 Pages.
Non-Final Office Action received for U.S. Appl. No. 13/594,472, dated Jul. 23, 2014, 22 Pages.
International Written Opinion received for PCT Application No. PCT/US2007/006180, dated Oct. 2, 2007, 6 Pages.
U.S. Appl. No. 11/646,711, filed Dec. 28, 2006, Issued.
U.S. Appl. No. 14/611,547, filed Feb. 2, 2015, Issued.
U.S. Appl. No. 15/817,902, filed Nov. 20, 2017, Issued.

\* cited by examiner

Use Case: Item Search/Retrieval Process – Buyer side

- STEPS
- Buyer sends a query to a search service (operated on search node)
- Seller makes available to search service an indexed Item XML document signed by seller and central electronic marketplace
- Searching service processes signed, indexed item document and matches search keys
- Buyer receives indexed form of an item (keys) and views thumbnail
- Buyer sends SOAP request to seller to get full item details in SOAP request (by confirming the previously received signed item index) using specific itemID
- Seller responds with item details incl. description in SOAP response

Figure 6

PEER-TO-PEER TRADING PLATFORM

CROSS-REFERENCE TO RELATED PATENT APPLICATIONS

This application is a continuation of U.S. application Ser. No. 15/817,902, filed Nov. 20, 2017, which is a continuation of U.S. patent application Ser. No. 14/611,547, filed on Feb. 2, 2015, which is a continuation of U.S. patent application Ser. No. 11/646,711, filed Dec. 28, 2006, which claims the benefit of U.S. Provisional Patent Application Ser. No. 60/743,466, filed Mar. 13, 2006, the benefit of priority of each of which is claimed hereby, and each are incorporated herein by reference in their entirety.

BACKGROUND

1. Technical Field

This disclosure relates to methods and systems supporting online consumer interactions by a user in a networked system.

2. Related Art

Conventional network-based marketplaces (e.g. consumer websites) provide users with functionality to browse a collection of items (e.g. goods or services) at a website and to make purchases using a variety of means. Centralized e-commerce over the web solves the problem of reaching the largest possible market; but, this centralized model is not appropriate for all kinds of items and services. The centralized model may also have trust and safety problems; because, buyers and sellers are connected based purely on the basis of price and features of the item being sold. Reviews, feedback ratings and other mechanisms attempt to solve this problem; but do not provide a traceable path of referrals between two parties who wish to trade.

The architecture of web based e-commerce is based on a web browser that has very little ability to store state locally and a centralized web site that holds all the information. This limits the user experience to the confines of a web page, and results in latency when viewing information that has to be downloaded from the web on each click. The web site itself has scalability issues and may slow down at times of high traffic. The web site may also have availability issues; because the web site must be running at all times to provide the service.

The prevailing model for e-commerce is that the seller is offering items for sale to anyone with a verifiable ability to pay. However, there are classes of items, such as family heirlooms, where the seller would like to constrain the scope of the sale to family members (or other defined group), and select the most deserving recipient rather than the highest offer for an item. Another example is a charity auction inside a company, where individuals offer items such as lunch with top executives, a ride in the CEO's aircraft, etc. and want to have each individual manage bidding on their items while constraining the entire auction to be only visible to co-workers.

It would be advantageous to support e-commerce on conventional peer-to-peer (P2P) networks. However, conventional P2P networks do not currently adequately support e-commerce models. For example, there are currently no P2P message exchange protocols that are efficient, secure, reliable for C2C/C2B (consumer-to-consumer/consumer-to-business) and designed for multi-channel communication networks that exploit both TCP/IP internet and VOIP-like networks. Historically, development of B2B (business-to-business) messaging protocols have taken place with different problems drivers and user community requirements.

BRIEF DESCRIPTION OF THE DRAWINGS

Embodiments illustrated by way of example and not limitation in the figures of the accompanying drawings, in which:

An architectural overview of an example embodiment of a peer-to-peer (P2P) platform client is shown in FIG. 1.

FIG. 6 illustrates an item search/retrieval process from the buyer perspective, according to an example embodiment.

DETAILED DESCRIPTION

In the following description, for purposes of explanation, numerous specific details are set forth in order to provide a thorough understanding of an embodiment of the present invention. It will be evident, however, to one skilled in the art that embodiments may be practiced without these specific details.

Figure 1:
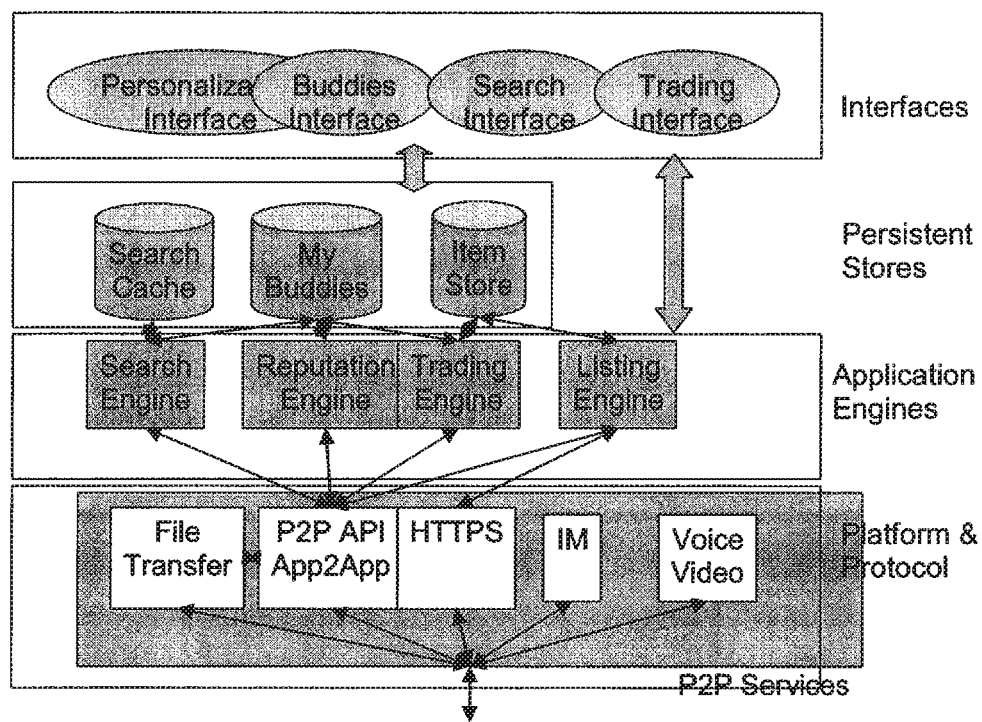

Below are described various aspects of a peer-to-peer (or distributed) computing system that may be utilised for the communication of data. Aspects of the example peer-to-peer (P2P) system may include the following functional components. A system architecture of an example P2P trading platform for a client system is illustrated in FIG. 1.

P2P Marketplace Platform

In an example embodiment, P2P clients may be used for e-commerce and trading. The system may thus reduce the dependency on browsers for such functions, and enable search independent of a central search server.

Secure P2P Message Exchange Protocol for Trading Service Networks

Example message exchange protocols and communication model for a P2P marketplace are described herein.

Secure Transaction Model for Distributed P2P Commerce Using Presence-Aware Protocols The following example security and trust and safety (TnS) features for a P2P marketplace are described herein:
1. Item certification when a seller wants to make an item available for sale in the P2P trading community.
2. User authentication services during the process of the sale of an item.
3. Provide mechanisms for buyer and seller to provide feedback on the transaction.

P2P Search with Caching

The following example search features are described herein:

Search on encrypted items. These items may also be certified.
1. Transmission of results encrypted. Only the finder may be able to decrypt the results of his search.
2. Privacy: a finder's identity may be hidden from other P2P clients as it performs a search. The items searched may also be hidden when searched via a third party node. For example, A searches and gets to node C through node B. The results of the search may be cached in A and B but encrypted.
3. Mechanisms to limit the number of found items, the used bandwidth and central processing unit (CPU) cycles.
4. Mechanisms for cache management: when a finder performs a search his results may be cached so that his "buddies" can search the cached results. The time to live (TTL) of a search or items may be managed as well as the cache size.
5. Search on items with attributes as opposed to files and in which there is no download following the search.
6. The search relies on the buddy lists up to a certain number of hops.
7. Inclusion of particular hosts or other peers by default in the buddy list. This may be hidden from the actual buddy.
8. Caching of searches that are reused by others Roles Based Transactions Example embodiments, as described herein, may enable teens and enterprises to perform e-commerce. Several players may be involved in a transaction besides the buyer and seller.

Relative Reputation Based Item Search and Buddy Rating

In an example embodiment, a reputation of another node may be relative to its position in a social network. A "relative reputation" may be established as a function of, for example, an absolute reputation (e.g. eBay feedback score); buddy connection paths that exist between the two nodes; and the opinions that exist on each step on the connection path.

Franchise Model

As an example P2P trading community grows, an entity may want to franchise the TnS service to other companies. A franchise may offer the same services as the TnS service described above, since a franchising entity may maintain control over the P2P application, the compliance, revocation and control any exercised from the application.

P2P networks lack the central site that arbitrates disputes, establishes trust where commercial transactions can take place, and polices bad behavior. In fact, most if not all P2P networks host activities that contain elements of illegality.

As described herein, a P2P marketplace host can introduce the necessary trust so that commercial transactions can happen in a P2P network. The solution in itself can limit users with a plug-in that only enables certification and authentication of users and items through the P2P marketplace host.

A P2P marketplace host can franchise the certification and authentication service it provides to items and users to $3^{rd}$ parties (e.g. Amazon, Google). These $3^{rd}$ parties would not certify P2P marketplace host users or P2P marketplace host items but rather their own users and items. They would however use the P2P marketplace host protocols and message formats as defined by the P2P marketplace host so that the same plug-in can be used regardless of who establishes the trust in a transaction.

P2P Marketplace Platform

The P2P network, according to an example embodiment, consists of "P2P nodes" rather than "web clients" and "web servers." A P2P node may operate both a provider and consumer of services, so it is both the client for some operations and the server for other operations. A system architecture of an example P2P trading platform for a P2P node system is illustrated in FIG. 1.

P2P networks have existed for a while and have been used mostly to exchange files. They do not need the support of a central server or need to rely on a browser or HTTP. The P2P nodes connect to each other directly using a P2P protocol. A P2P network may be based on communication between its members, Where each member has a buddy list of other members that is used to constrain and route communications. This form of P2P network implements a social networking model that may be used to enhance e-commerce and other network-based interactions In an example embodiment, a large scale P2P network may employ an existing communication based P2P network (e.g., Skype) to enable online e-commerce. Such a network may rely on the P2P node to perform certain functions of online transactions, for example:
a. Create items and services that are offered for sale, including optional constraints on who can see and who can make offers on the items and services.
b. Search for and select an item for purchase, again using optional constraints on which you choose to send the search to.
c. Support a variety of deal making mechanisms, negotiation of terms and facilitate an agreement
d. Facilitate payment and delivery or interface to existing financial mechanisms (e.g., PayPal).

The P2P client application, according to an example embodiment shown in FIG. 1, may maintain persistent state that includes items that are being offered by that client, and items that are the results of previous searches. Operations on these cached items may not involve any network traffic so the scalability, availability and response time problems of centralized web based e-commerce may not apply. New and updated items may be passed between nodes at any time, and popular items may be cached throughout the P2P network, which prevents the network connection of any one node from being overloaded.

In a peer-to-peer network, the network connection may be shared by chat, voice traffic, and file transfers that the peer-to-peer client application supports. Because the e-commerce traffic is also passing through the peer-to-peer client application, the peer-to-peer client applications may be configured to prioritize and control bandwidth. For example when a voice call starts, the peer-to-peer client application may slow down file transfer and e-commerce traffic to maintain call quality. If a web browser was being used to view content from an e-commerce web server at the same time as a voice call (perhaps to discuss what to buy), the two applications may contend for bandwidth, reducing voice quality and giving a slow e-commerce experience. In an example embodiment, items of interest may be cached already, and the user interface is a local application rather than a web site, so more bandwidth is available for a voice call and the buying experience is not impacted.

The search function, in an example embodiment, is performed by querying buddies (e.g., people that a user already knows) and asking these "buddies" to search items from their buddies. Several possible query and item message routing policies may be used depending upon user preference and the level of trust that exists between two nodes. For example:

a. In one case, searches only reach an immediate buddy list, and the buddies only return items that they are offering themselves.

b. If a node decides that it trusts items from a buddy, and wants to share the item with third parties, then a response to a received query can include a selection of all items that have been cached at that node. In this way, popular items from trusted sources may preferentially migrate throughout the P2P e-commerce network. In this case, a query may result in an item that is being offered by a node that is not in your buddy list. Attempts by the buying node to contact the selling node may be at the discretion of the seller to accept, and can lead to a transient or permanent buddy connection between the two parties.

c. If a node decides that it trust queries from a buddy, and wants to share the query with third parties then queries may be cacheable and persistent items, so that duplicate query loops may be identified as they flow from node to node through the social network. A short query lifetime (e.g., time to live) and a hop count limit may be used to help constrain searches.

d. If a user cannot find an item but wishes to make it known that he or she was looking for something, then a search query may be made persistent with a longer lifespan and may be propagate further through the peer-to-peer network. This feature may be used to support "I Want" or "Want it now" functionality and may also be surfaced differently in the user interface so that sellers can see demand and add new items to meet the demand. In this case, the seller may attempt to contact a buyer directly and this connection is at the discretion of the buyer to accept if they are not already buddies.

e. Connections can, in various example embodiments, be made directly as described above, or indirectly via a routing protocol. In this case messages could be exchanged between nodes that are not buddies as long as the intermediate nodes are willing to cooperate.

Payment may occur using any online service payment (e.g., PayPal), it can also be integrated into a peer-to-peer (e.g., the Skype) payment system that may be optimized for making small payments such as per minute call rates (e.g. for SkypeOut service). For trading with nodes that are not trusted members of the immediate buddy list, support for an escrow based payment system may be integrated into the P2P e-commerce node application.

In centralized web based e-commerce, the central site provides a de facto trust and safety service. For example, users go to eBay, Amazon etc. because the users trust these sites and they have established a strong brand reputation.

The P2P client (e.g., e-commerce node application) that is used for online e-commerce transactions may also access a trusted site that authenticates the parties and certifies the items involved at the appropriate times of the commercial online transaction. In this way, a P2P marketplace is created that has the same listings rules for permitted items on a trusted marketplace (e.g., eBay, Yahoo!. Amazon.com or Google). An example additional benefit is that if an item does not sell on the P2P network, it may be converted and migrated to a conventional marketplace (e.g., eBay) listing for access to a wider audience. This follows an example case of wishing to offer items and services to friends and family on favorable terms, then selling unwanted items on the open market, but not wishing to repeat the work involved in generating a listing.

In an example embodiment, if a user is an existing seller on an e-commerce web site (e.g., eBay), then the user's own social network may not be aware of the items that that the user has available on the open market. The P2P e-commerce node application may, in one example embodiment, also connect to a central e-commerce web site, using an API call, for the purposes of downloading item descriptions and converting them into a format that can be shared in the P2P e-commerce network. In a further example embodiment, a central e-commerce site (e.g., eBay) may connect its own sellers to the P2P network by having the sellers link a pay peer-to-peer user name (e.g., Skype name) to a marketplace name (e.g., eBay name), then hosting a link to the P2P network within eBay's own datacenter infrastructure. This example feature allows P2P power sellers to host items on a highly available high bandwidth platform, rather than on their own computer systems, and to maintain synchronization between marketplace items (e.g., listed via a central server) and the same items listed in the P2P network. If an item sells in one marketplace, the item can be removed from the other marketplaces and the P2P network automatically. One example benefit of listing items in the P2P network (e.g., marketplace), as well as on the open marketplace server, is that a seller can reach buyers who only use the P2P network, Another is that buyer-seller social relationships can potentially drive repeat business better than in an open marketplace.

Social networks may need to overcome a boot-strapping problem. A new user of a P2P e-commerce tool may not have any other users in their buddy list. An example embodiment provides a mechanism to connect isolated nodes and isolated clusters of nodes into larger clusters with broader availability of items. The example embodiment provides a central referral service where selling nodes can advertise themselves as being prepared to accept connections from anyone meeting some specified, published criteria or conditions. This supports the ability for sellers to register keywords that represent their items, e.g. "Skype headset", and also provides an advertising revenue model based on buying keywords to direct a larger proportion of referrals to a specific seller. If the seller establishes themselves as a trusted buddy of the buying node taking the referral, the seller becomes part of the social network of that buyer, and has further selling opportunities.

In an example embodiment, a reputation of another node may be relative to its position in a social network. A "relative reputation" may be established as a function of, for example, an absolute reputation (e.g. eBay feedback score) buddy connection paths that exist between the two nodes and the opinions that exist on each step on the connection path. Opinions may be based, for example, on completed transactions and may also be category specific. For example, the relative reputation of a node may vary depending upon whether the item being considered is a car, a game or a service.

E-commerce web sites may require that buyers and sellers are of legal age and have good credit. Nodes in a P2P network may not necessarily have this restriction, and many teenagers or users in developing nations are able to use peer-to-peer services (e.g. Skype), but are not able to register for established services (e.g., those offered by eBay or PayPal). In an example embodiment, a P2P e-commerce platform provides an alternative mechanism for these communities to trade. However, members of the communities may not be able to enter into a legally binding contract (e.g. because of underage issues) and have no access to a payments system. A system of roles can be established that allows a single established account (e.g., an eBay and PayPal account) to be associated with one peer-to-peer network account (e.g., a Skype account) that acts as a controlling authorizer for transactions. Additional peer-to-peer network accounts can be added with restricted roles. For example a child role may be added by the authorizer, and the child may list items for sale and select items to buy using their own peer-to-peer network name, but the responsible adult authorizer is automatically included in the transaction at the point of contractual commitment and payment.

Secure P2P Message Exchange Protocol for Trading Service Networks

According to an example embodiment, there is provided a run-time application hosting model and application-to-application messaging protocol to deploy buyer, seller, search application services that enable buyers and sellers to conduct secure, peer-to-peer trading transactions over multi-channel communication networks such that marketplaces act as security, registration, and/or TnS service providers for a community of buyers and sellers.

An example embodiment provides a P2P business services platform which has built-in connectivity and communication services with multiple trading participants (e.g., eBay, PayPal, Skype and possibly other entities such as buyer and seller agents).

An example embodiment provides a P2P message exchange protocol that enables communication between trading services hosted at end-user machines (e.g. home computer, laptop, PDA, small-office, enterprise servers) These trading services may act as local services for a buyer or a seller and be controllable and consumable by end user buyer/seller interactive applications (e.g., such as a P2P Trading Toolbar).

An example embodiment provides a P2P message exchange protocol that is efficient, secure, and reliable for C2C/C2B (consumer-to-consumer/consumer-to-business) and designed for multi-channel communication networks that exploit both TCP/IP internet and VOP-like networks.

An example embodiment employs a standard XML schema (e.g., the eBL (eBay Business Language) Schema Model) for describing Interfaces for P2P Trading Services.

An example embodiment exploits peer-to-peer data channels (e.g., Skype Data channels), which are extended to support SOAP messaging channels. Asynchronous messaging, in an example embodiment, is used for sending and receiving application messages for buyer, seller, search services, exception. Host Document-centric application services may be deployed, in an example embodiment, at peer-to-peer end-points to develop P2P SOAP Framework.

A P2P Trading Protocol, according to an example embodiment, is encapsulated/integrated into an XML-based presence protocol (e.g., Skype Client Plug-in or similar XML-based presence protocol), so as to enable deployment of document-oriented services that can send and receive a variety of different messages for trading use cases (e.g., buyer, seller, and search). Such a run-time environment may enable deployment of P2P Trading Platform which posts a variety of peer services. These services are materialized or rendered into interactive applications (e.g., a toolbar).

Secure Transaction Model for Distributed P2P Commerce Using Presence-Aware Protocols An example embodiment seeks to enable P2P e-commerce between sellers who can list items that are stored on their local computers and network accessible devices (e.g., PDAs, wireless/mobile systems) and buyers who can search and buy items only when sellers become available, present, and connected on a P2P network which poses multiple security, privacy, distributed trust model and registration challenges.

An example embodiment includes a distributed, P2P marketplace where item listings are on local seller machines and may require item listing certification and item life-cycle management process such that, for example:

a. A seller may be verified as an authenticated item listing party;

b. A trading community may be protected from being flooded with inappropriate items; for example, by enforcing that sellers only list items that do not violate any legal/regulatory, business and community policy standpoint.

c. Buyers who search for items listed in the P2P community network may be protected from downloading viruses and other harmful executable code (e.g., by blocking Javascript. ActiveX scripts embedded in item data).

d. Buyers are provided some level of trust that sellers are trust worthy and vice-versa; and e. Items listed may be de-listed (e.g., if the seller is known to be bad seller, if seller needs to be suspended or, if item is already purchased and sellers needs to be blocked from re-listing items that have been checked-out and paid for by a buyer; or, if item is found out to be a bad item after it was listed).

An example embodiment includes a distributed, P2P marketplace where sellers and buyers communicate over a multi-media communication network (e.g., VOIP-like communication medium provided by Skype) which leverages an on-line presence protocol (e.g., to inform the trading community whether a buyer or seller is available or not by modifying the icon depending on whether you are at the keyboard or away). Authenticated application-level connections may be provided between buyers and sellers who exchange searching and buying messages.

According to an example embodiment, a distributed, P2P marketplace where sellers and buyers communicate over a multi-media communication network which leverages an on-line presence protocol (to inform the trading community whether a buyer or seller is available or not) may require the message payload is protected while in transit between buyer and seller over the P2P network.

In an example embodiment, an e-marketplace operator hosts a P2P Item Listing Certificate service that leverages trust and safety (TnS), Security, and Registration functions available in a trusted e-marketplace. Hence, the role of the e-marketplace may be to provide TnS, Security, and Registration services, for example, to buyers and sellers during an item listing process, a post-item listing process, and an item check-out process.

TnS/Security/Registration Services

The e-marketplace services provided may include:
a. Item certification when a seller wants to make an item available for sale in the P2P trading community.
b. User authentication services during the process of the sale of an item.
c. Provide mechanisms for buyer and seller to provide feedback on the transaction E-marketplace Interfaces: Buyers and Sellers may, in various example embodiments, communicate with the e-marketplace over XML/HTTPS, Web Services SOAP APIs or equivalent protocols. These marketplace interfaces may be integrated into the peer-to-peer client application (e.g., a Plug-in that supports a P2P Trading Services Platform). The P2P Trading services Platform may provide built-in application-to-application secure connectivity and communication services with multiple trading facilitators (e.g., eBay, PayPal, and Skype).

Multi-community Registration Links Users may be associated with communities (e. Skype/eBay/PayPal Communities).

Automatic, Asynchronous Post-backs to Seller's P2P Platform one example embodiment, functionality is provided to eliminate or disable listings (e.g., de-list items) of sellers who have been suspended. In an example embodiment, this may be achieved using a post-back mechanism from a server-based e-marketplace (e.g., eBay) to a peer-to-peer client to update status of an item. An item_Status_Update service may be exposed in a P2P Trading Platform (e.g., implemented utilizing peer-to-peer clients, or a plug-in to such clients) in support for a P2P crawler to eliminate listings in the cloud upon member suspension.

The previous item may require that, as soon as a seller's presence is known to the e-marketplace, (e.g., as soon as the seller is available on-line), the e-marketplace operator needs to send any critical business events to that seller. For example, this may be supported by an automatic, asynchronous message: "Hello Marketplace, I am on-line" transmitted to the e-marketplace when the P2P Trading Platform (e.g., implemented utilizing peer-to-peer clients or plug-ins to such clients) is initialized as part of the start-up process of seller's machine or other communication device. This initial "authenticate_me" message results in the e-marketplace first authenticating the seller or buyer who is connecting into the P2P trading network, and the issuance from the marketplace of a success or denied synchronous response. The e-marketplace may respond asynchronously with any business critical events that were waiting in a queue for that seller. This may be implemented as a generalized communication model to provide feedback for many different types of business critical events that require immediate post-back when a trading party makes itself available over a P2P Trading Network.

Item end actions are need, in an example embodiment, to end bids and inform bidders. This type of action may need to be incorporated into the crawler or implement a different type of crawler.

Support for Safer items off-e-marketplace in the P2P Trading Network. The beginning and end of transactions will, in the example embodiment, be locked down. TnS may check item at listing-time and at selling-time and possibly update items between listing and selling time. TnS checks and item certification may be asynchronous. Items may be available (for search/bidding) on seller site on a P2P network, according to example embodiment, but a peer-to-peer item DB may be maintained at e-marketplace (e.g., eBay) which may still the searchable index and raw item data (e.g., in XML format). This database will, in an example embodiment, have a log of all the items of what was authorized and certified by the e-marketplace. The e-marketplace operator can run against the item database required TnS and security check. This will allow the e-marketplace operator to de-list the seller, for example if the seller is found later to be involved in any disqualifying activities.

Encrypted Items and Controlled Item Access. Items not being in a centralized marketplace (e.g., eBay) may require encryption of the items. Because someone could try to hack a peer-to-peer commerce client or get illegal access, it may be advantageous to prevent illegal access or crawling of seller's item listing. To protect such hackings or illegal P2P searches, item listings may be encrypted when listed on a seller P2P platform. Items listed in a seller P2P platform may be encrypted using public encryption certificate, thus allowing a seller to control who will have access to the item via a search request.

In an example embodiment, signed items listed and certified may contain two signatures: (1) signature of the seller who is listing the item and who has been verified by a trusted entity (e.g., an e-marketplace operator, such as eBay Inc.) to be a registered seller; and, (2) signature of the e-marketplace over the item to indicate that item is certified by the trusted entity (e.g., an e-marketplace operator, such as eBay Inc.) to be a legitimate item available for P2P trading. The seller's signature operates to bind the item to that seller.

In one embodiment, buyer information is used (e.g., to show userID) to detect shill bidding when buyers contact sellers.

EXAMPLE PROTOCOL DEFINITION (e.g. OCCAM) FOR SECURE TRANSACTION MODEL

P2PLINK protocol definition using Occam-pi language
  CHAN TYPE P2PLINK:
    forward declaration to allow protocol to carry its own channel type PROTOCOL SKYPE.P2P
CASE
  chat protocol
  namedrop; INT; INT; SHARED P2PLINK!; [8]BYTE
    fromid; toid; respchan; another skypename
  seller side protocol elements
  about.me; INT; INT; SHARED P2PLINK!; INT::[ ]BYTE
    fromid; toid; respchan; description inventory; INT; INT; SHARED P2PLINK!; INT; INT; INT::[ ]INT
  searchid; ebayid; itemcount::itemids description; INT; INT; SHARED P2PLINK!; INT; INT; INT; INT; INT::[ ]BYTE
  searchid; ebayid; itemid; pennies; description reject; INT; INT; SHARED P2PLINK!; INT; INT; INT
  searchid; itemid; bidid accept; INT; INT; SHARED P2PLINK!; INT; INT; INT
  searchid; itemid; bidid; hold.until ship; NT; INT; SHARED P2PLINK!; INT; INT; INT; INT
  searchid; itemid; bidid; trackid invoice; INT; INT; SHARED P2PLINK!; INT; INT; INT; INT; INT
  searchid; itemid; bidid; invoiceid; invoice receipt; INT; INT; SHARED P2PLINK!; INT; INT; INT; INT; BOOL
  searchid; itemid; bidid; invoiceid; paid completed; INT; INT; SHARED P2PLINK!; INT; INT; INT
  f; t; r; s; i; b abandoned; INT; INT; SHARED P2PLINK!; INT; INT; INT
  f; t; r; s; i;
buyer side protocol elements query; INT; INT; SHARED P2PLINK!; INT; [12]BYTE fromid; toid; respchan; searchid; keyword get item; INT; INT; SHARED P2PLINK!; INT; INT searchid; itemid bid; INT; INT; SHARED P2PLINK!; INT; INT; INT; INT searchid; itemid; bidid; pennies confirm; INT; INT; SHARED P2PLINK!; INT; INT; INT searchid; itemid; bidid unconfirmed; INT; INT; SHARED P2PLINK!; INT; INT; INT searchid; itemid; bidid inquiry; INT; INT; SHARED P2PLINK!; INT; INT; INT searchid; itemid; bidid arrived; INT; INT; SHARED P2PLINK!; INT; INT; INT searchid; itemid; trackid payment; INT; INT; SHARED P2PLINK!; INT; INT; INT; INT; INT f; t; r; s; i; h; invoiceid; payment dispute; INT; INT; SHARED P2PLINK! INT; INT; INT f; t; r; s; i; b

CHAN TYPE P2PLINK

MOBILE RECORD

CHAN SKYPE.P2P c?:—shared writer, single reader

Searching in the P2P e-Commerce System

A description of the example search functionality in an embodiment of the P2P e-commerce system is provided below, In a traditional centralized model (e.g., eBay Marketplace), the index of the available items is maintained in a centralized server system. A prospective buyer searching for an item launches a search from a browser and the search keywords are matched against the indices of the items in the database that is published into by the sellers. The centralized server system provides reliability, integrity, and security for the data. It ensures that the indices are secure and the transportation of the search query and returned search results are secure.

When commerce takes place over a Peer-to-Peer network, the issues related to search may be quite different. Example differences with the traditional centralized model are described herein.

Distributed vs. Centralized: There may be no "centralized server". The devices/computers that each of the 'nodes' in the system act as participating servers in the overall network. Dynamically, some of these devices may be upgraded to be a 'supernode' that caches or serves up data.

Reliability: In an example embodiment, because there is no clear centralized server system, the reliability of the network itself is not guaranteed. Peers might come and go away between searches. As a result, the results returned may vary when the same search is performed at different times.

Trust Level: The searches launched are not against a centralized server but over the network. Because, based upon the groups different actors belong to, the search path may cross nodes or actors who are fully trusted, partially trusted, or not trusted at all.

Synchronous vs. Asynchronous: Searches in a P2P network may not be blocked (aka rpc) and need not be deterministic. This means that depending on the freshness of the cache, and how far and wide the search is launched in the network, not all results may be returned. Also, depending on the path the search takes, different sets of results may be returned when launched from different nodes, or when launched at different times.

In an example embodiment, peer-to-peer clients can list items for sale in the system (e.g., the peer-to-peer trading platform). The items may, in one example embodiment, be listed to be visible at various circles of familiarity or trust. For example, items may be listed to be sold only to buddies, or buddies of buddies, and so on, or for anyone using the system. Listed items may have information like title, subtitle, detailed description, representative keywords, attribute-value pairs, category information besides information about availability, duration, and price, merely for example.

A peer searching for an item, in an example embodiment, searches through a client interface that allows just typing in keywords or advanced search with AND, OR connectors over keywords and/or attribute values.

In addition to the above mentioned search criteria, functionality may be provided to restrict/filter searches as follows:

Search for only items that are certified (e.g., if it is possible to list non-certified items) by some central body or trusted entity (e.g., eBay).

Search scope (e.g., the list or circle of peers over which to search, the minimal qualification in terms of reputation of the peers to search, etc.)

Category (e.g., the categories under which the items listed are to be searched in)

Price range of the items

Explicitly included or excluded peers selling the items

Item location

Ending time

Trust level (e.g., a search may be filtered to include only items offered (or stored) by buddies where relative trust exceeds a predetermined threshold).

Search messages and result messages may be delivered over a secure encrypted P2P communication platform. This avoids snooping on the P2P traffic itself by adversaries.

Because P2P networks can be potentially large, for P2P searches to be efficient searches, search results may need to be cached at various nodes in the network. P2P searches may afford caching because peer availability is not mandatory, search typically is streaming or asynchronous, and search results need not be deterministic or complete. Also, conceptually a P2P network is 'infinite', search queries may have a time-to-live (TTL) and the reachability of nodes and finiteness of search results may be controlled in this manner.

Caching

Caching may, in an example embodiment, be implemented in two ways:

1. Caching as a part of routing: When searches are launched over the network, intermediate nodes may implicitly cache the results of a search that is returned through them to the requesting peer. This caching decision may be based on the criticality of the node being in the path of the search and the popularity of the search query itself, merely for example. Other criteria like node or path reliability or availability, cache reuse, etc. may be used to determine how much, where, and how long such a cache is to be maintained.

2. Caching based on past searches: In a simple multi-level buddy system, past queries and search results may be cached in a peer who makes the search request. When a new request for a similar/same search comes to/through that peer, the cache is first looked at for its freshness and returned. It is possible also that the cached results are returned for immediacy while the search continues. The cache is updated with new data when it becomes available and the newer results are returned to the requesting peer.

Indexing

Listed items for sale may be indexed for search efficiency as can be the case with caching. Searchable and cached items are, in an example embodiment, indexed and a search query is a look up against the cache index. The indices may be search engine indices with a facility to go back to the original document to reconstruct exact details.

Encryption

Given that a P2P network may be large and searches launched pass through buddies, trusted peers, and unknown peers, encryption and access control of both searchable items and search requests may be utilized to provide security within a P2P network. While a peer might host or cache a set of data that serves as a part of the search results for another peer on his/her own machine, it is not possible, in one example embodiment, for the peer to look into either the search string or the result set that is cached on that machine. At the same time, the peer who requested the search can recover the query and the search result. Several levels of security may be provided. Also, encryption may be combined with indexing to combine efficiency with information hiding.

Example embodiments include:
1. Listings (indexed or otherwise) may be encrypted by combining with generated ciphers on a per-peer basis. Search may be allowed on the encrypted data by creating additional ciphers on a per document, per category, per peer or per peer-group basis, for example.
2. For the case where a peer acts as a mere cache resource (and does not participate in a search), hidden searches may be supported. This means that search words are pre-encrypted and then stream encrypted to ensure that the search is hidden. Encryption schemes that can recover original strings back are required to enable the searching client to display may be the contents of the searched item.

Indices can be encrypted in a manner similar to actual data. Decrypting and retrieval happen in a 2-way round trip, once to get the encryption of the index, and once to get the encryption of the data.

Advanced Queries

Boolean, proximity, and phrase queries may be easily generated. More complex queries may explode the query space but the above described system may be implemented, in an example embodiment, by repeatedly generating ciphers of the simple components of the queries.

Role Based e-Commerce

Centralized e-commerce marketplaces (e.g., E-commerce web sites such as eBay.com) may require that the buyers and sellers are of legal age and/or have good credit. Nodes in a P2P network may not have this restriction, and many teenagers or users in developing nations are able to use peer-to-peer services e.g., Skype) but are not able to register at certain sites and services (e.g., eBay and PayPal). The P2P e-commerce platform, in one example embodiment, provides an alternative mechanism for these communities to trade but they may not be able to enter into a legally binding contract and have no direct access to a payments system.

Consider that ecommerce transactions on many centralized e-commerce marketplaces are a binding contract. As a result only adults are allowed to transact on such marketplaces. Further, the ecommerce model of a buyer and a seller is not well suited for enterprise trading where there are multiple approvers and the requestor, salesperson, purchasing department, shipping and receiving are all separate entities. Another example may happen in complex financial transactions such as escrow where there are multiple payers or multiple parties that receive portions of the payment (e.g. house sales). The above described factors may have the effect of limiting the market of potential buyers and sellers, and slows adoption of e-commerce by the next generation of teenagers.

An example embodiment described herein associates roles to individuals involved in a transaction. Example embodiments are equally applicable to a centralized e-commerce site (e.g., eBay) and a social network based P2P marketplace.

Figure 2:
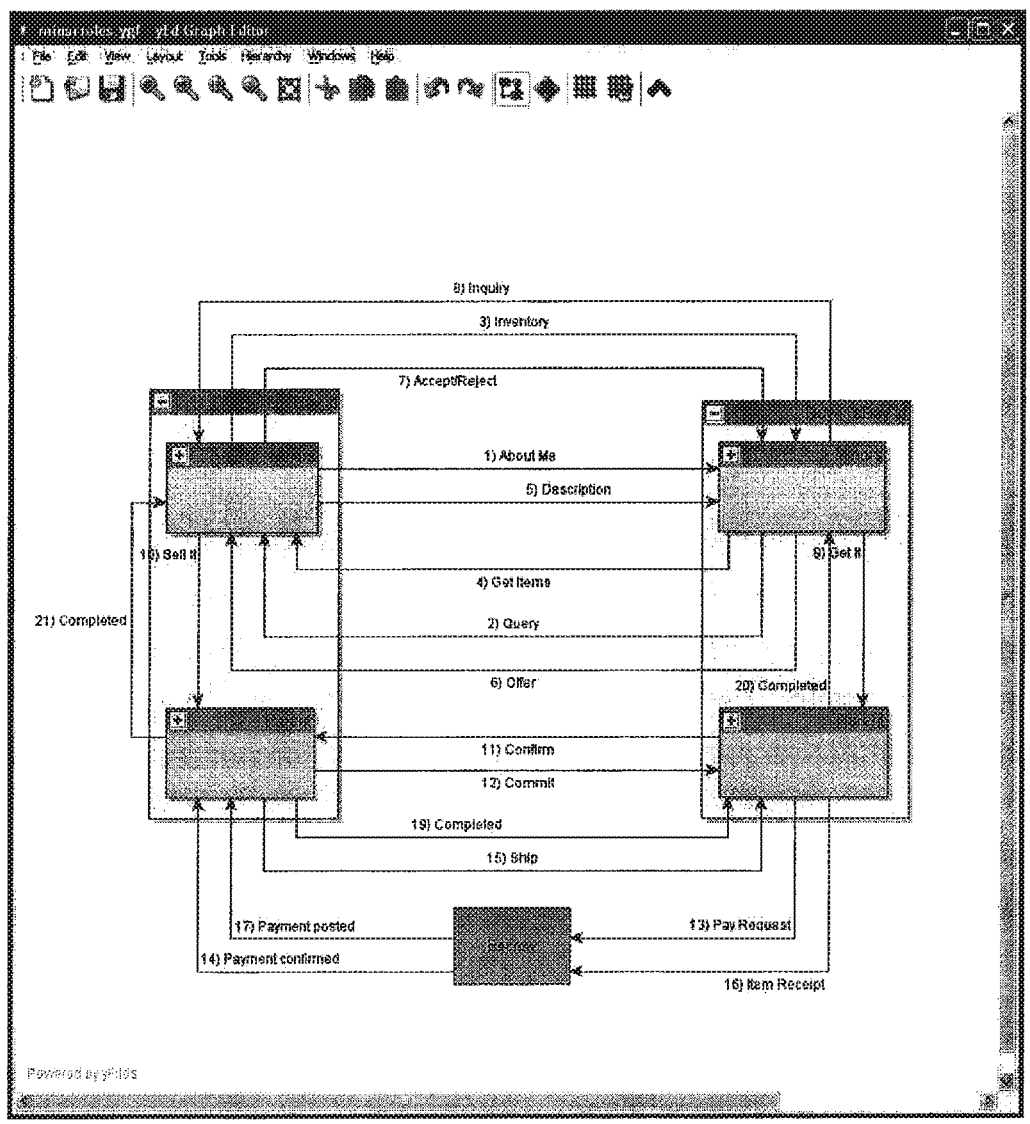
FIG. 2 illustrates an example architecture of a system supporting roles, according to an example embodiment.

The case of minors is described below and illustrated, by way of example, in FIG. 2:
1. In one example embodiment, a system of roles is established that allows a single account established with a trusted entity (e.g., an eBay and PayPal account) to be associated with one peer-to-peer account on a peer-to-peer marketplace or service may be (e.g., a Skype account) that acts as a controlling authorizer for transactions. Additional peer-to-peer accounts can be added with restricted roles. For example a minor child role may be added by the authorizer, and the child may list items for sale and select items to buy using their own peer-to-peer user name, but the responsible adult authorizer would automatically be included in the transaction at the point of contractual commitment and payment.
2. In another embodiment, adult authorizers have trusted accounts (e.g., eBay accounts) and minor roles have "lite" accounts. A lite account may be associated with a peer-to-peer (e.g., Skype) account. An individual may have multiple lite accounts. These accounts are linked to regular trusted accounts. A minor with a lite account can search and browse as non-registered users can. When the minor wants to make a purchase/submit a bid, the request for such an action goes to the owner of the trusted account, who can either reject the action, approve it and send it back to the minor to perform it or directly perform it.
3. Approvals may be transparent to the adult in the sense that the adult (e.g., a parent) can pre-authorize expenses within specified constraints. For example, in a certain category, up to a certain amount and/or by given date. In this case the amount approved may be put in escrow.
4. The owner of the trusted account (e.g., the eBay or PayPal account) may be liable for the actions of the entire group of subsidiary roles and may be billed for the expenses incurred. In the event of actions that lead to account suspension by any member of the group, in an example embodiment the entire group is suspended.
5. In the case of a single trusted account, feedback accrues to that account. In the case of the may accrue lite accounts, feedback accrues to each account individually.
6. When a minor becomes eligible, his/her lite account is upgraded to a full account.

The case of using one trusted account and multiple peer-to-peer accounts will be used for clarity in the discussion that follows, but lite accounts could be substituted.

A group of adults may choose to link their accounts together, for example a husband and wife, or the executives and executive assistants of a company. In this way a single identifiable selling or purchasing point may be established without having to share passwords, and with separate identities for communication and auditing, and with full authority by everyone.

In an example embodiment, every operation in a transaction becomes an assignable role. Every role can be assigned to multiple peer-to-peer (e.g., Skype) accounts and the flow of the transaction can be automated and assisted.

Figure 3:
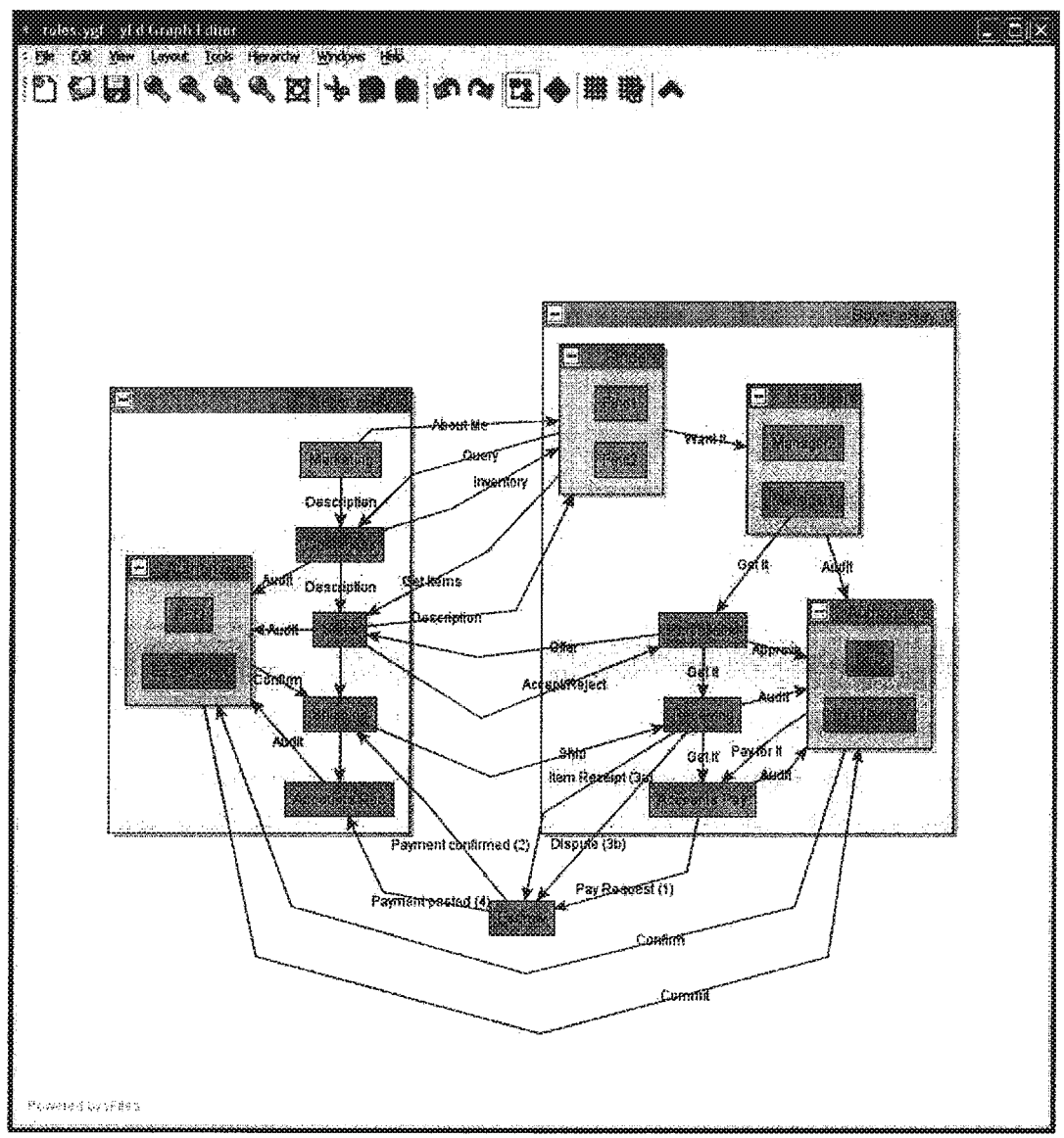
FIG. 3 illustrates an example architecture of a system supporting roles in an enterprise setting, according to an example embodiment.

In a business that wishes to buy and sell on an electronic marketplace (e.g., eBay) as a single entity, the individual roles can be assigned to many different peer-to-peer marketplace identities. An embodiment is illustrated, by way of example, in FIG. 3. For example, the CFO and executive assistant to the CFO have full administration and control over who takes on which role, and take on ultimate financial responsibility for the eBay account. In an example embodiment, on the selling side, the marketing role can create new item descriptions, the operations role can update the number of items available, the sales role can set the price and control which items are available for sale, the shipping and receiving role can generate tracking numbers and ship items, the accounts receivable role can generate invoices and send payment requests (e.g., PayPal requests). On the buying side, any employee can take on the finding role to pick an item to buy, the authorizing manager role approves the purchase, the purchasing role negotiates the price with the seller's sales role, the shipping and receiving role tracks the item and takes delivery, and the accounts payable role sends payment for the item. Whatever process is used in a business for buying and selling, the individual roles can be assigned via peer-to-peer (e.g., Skype) identities or groups which allow the correct communication pattern, and all roles relate to a single marketplace (e.g., eBay) identity. In the simple case, many or all roles can be handled by the same peer-to-peer identity.

Relative Reputation System and Buddy Rating

Buyers and sellers operating within a marketplace (e.g., eBay) or other, system may be rated based on a single global feedback score that is updated after each transaction. Such reputation systems, while having limitations, typically work well in a central site (e.g., eBay). However when one uses a P2P network (e.g., to do eCommerce or chat and socialize with buddies), the arbitrator role of the central site goes away.

For most people, their buddy list in a P2P social network is sufficient for socializing but too small for trading transactions. As a result, in P2P social networks, item searches for eCommerce purposes may go beyond the buddy list. An example embodiment provides a trust mechanism to provide a measure of safety was respected transactions performed within a peer-to-peer network.

In an example embodiment, the reputation of a first node may be established based on the first node's position in a social network relative to that of a second node. Accordingly, in an example embodiment, "relative reputation" may be established as a function of, for example: the absolute reputation (e.g. eBay feedback score); the buddy connection paths that exist between the two nodes; and the opinions that exist on each step of the connection path. Opinions may be based on completed transactions, for example, and may also be category specific. For example, the relative reputation of a node may very depending upon whether the item being considered is a car, a game or a service.

A centralized system feedback score (or other reputation information) (e.g., an eBay feedback score) would not be updated on a P2P transaction, so that traders on the centralized system would have a perceived advantage over purely P2P traders, deriving from their status as actively trading Confirmed Registered Users at an established centralized system more marketplace (e.g., eBay). This may provide an incentive for P2P traders to sign up for a centralized system and become active traders there, and a mechanism for punishing inappropriate or illegal activity by disabling an account maintained at the centralized system.

In an example embodiment, propagation of reputation information may be achieved in several ways. For example, an "explicit" approach may be to create a special protocol where messages are sent to establish the relative reputation between two points. Another "implicit" approach may be to pass information along with all items and search query messages that tags the message with the opinion. A node may accordingly decide what policy it wishes to apply. At one end of the scale, a very trusting node could pass on everything. The middle ground is not to pass on messages taken from nodes where it does not have a positive experience. The other extreme is to never pass on messages from other people. Minimizing traffic may be a desirable policy on a low bandwidth network, for example.

In an example embodiment, after an each transaction with a buddy, a user can rate the transaction as a positive or negative experience, or remove the buddy entirely. The user can also independently tag and rate this buddy's expertise in the transacting category. For example this would distinguish between someone providing Computer Technical Support Services who was an expert in the subject of MacOS, from someone else who is more of an expert in Windows. The tag (MacOS) may be applied by the consumer after the transaction, and can be shared with his social network. This allows other buyers to formulate searches that specifically seek out expert advice based on their friend's referrals.

In an example embodiment, when a user performs a search, it can go several levels deep into buddy lists and each path between the user and the "end nodes" (e.g., buddies that are the furthest away) can be given a weight based on the reputations entered by everyone. If for instance there are two paths to a seller, one two hops away and the other three hops away, with weights say 3 and 5 for the two hop and 3, 5 and 6 for the three hop, then the items for this seller could have a relative reputations of $0.5*(7+3)/2+0.5*(2+5+5)/3$, i.e. 4.5. The algorithm used to calculate reputation may be a personal choice, in an example embodiment, Reputations can be additive or multiplicative, they can be weighted by distance or treat everyone equally, and the multiple paths from buyer to seller can be accumulated or compared. A consistent opinion over multiple paths may be a good sign compared to wildly varying opinions, indicating a less consistent interaction style.

In an example embodiment, a buyer issues a search query message to any or all of their buddies. In responding to an incoming query, a node can provide a time stamped inventory list of item and seller identifiers that match the query. When the buyer receives the inventory messages and selects an item of interest, they may be able to get the full description of that item from multiple sources representing different routes from seller to buyer. Identical descriptions will have a common timestamp, but tagged descriptions will have an additional more recent timestamp. Accordingly, in one embodiment, all the variants are collected, the most recent content timestamp is identified and all the tagged information is merged to thereby generate new version that is then stored. Over time, popular items will migrate around the social network accumulating tags and a buyer can apply their own favorite algorithm to the tag information to decide whether to make an offer on the item.

In an example embodiment, new users start by trading with their immediate buddy list, and if they have verifiable purchasing ability (e.g., a PayPal account) they can also trade with P2P power sellers obtained from a central referral service.

Bad people and bad items may be shunned by this algorithm and are not passed on or connected to. They may end up isolated and have great difficulty propagating their items into the wider social network.

In an example embodiment, covert marketplaces may be operated by a closed circle of users. Detection of these marketplaces may be difficult unless the closed circle is broken by accident or infiltration. P2P networks such (e.g., Skype) provide sufficient capability for covert marketplaces to exist based on buddy groups, chat sessions and file transfers. In an example embodiment, a P2P marketplace may not enable the prevention of the existence of such covert marketplaces, but such covert marketplaces become somewhat easier to infiltrate since items are passed around and cached automatically. Getting access to a single node would implicate all the members of the closed circle if any illegal items were being traded. In addition, because the node may connected to a central marketplace (e.g., eBay) to get information (e.g., feedback ratings), and then log in to a P2P network, the presence and some information on the activity of the node may be collected.

The architecture of a peer-to-peer trading platform client, according to an example embodiment, is illustrated in FIG. 1. A series of additional figures, FIGS. 4-13, provide further details regarding an example embodiment of a peer-to-peer trading platform, which may operate in conjunction with a central electronic trading platform (e.g., a marketplace or retail platform).

Figure 4:
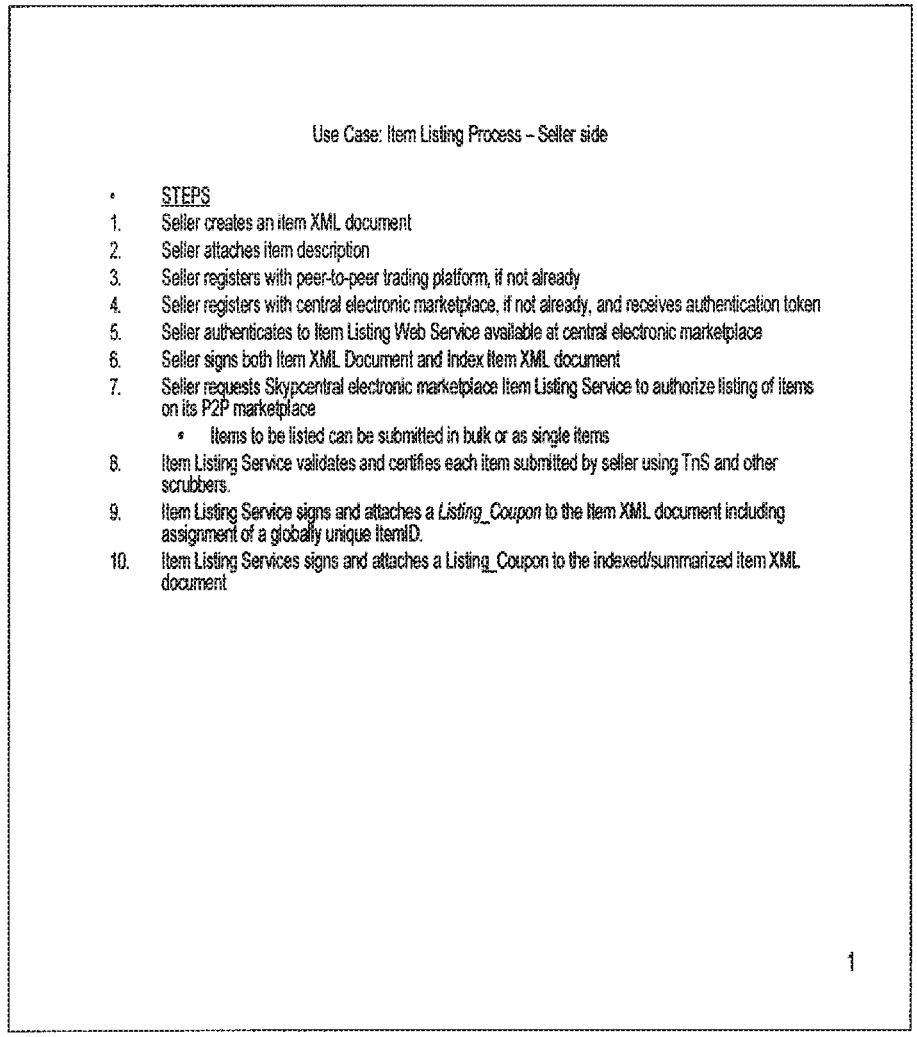
FIG. 4 illustrates an item listing process from the seller perspective, according to an example embodiment.

FIG. 4 illustrates an item listing process from the seller perspective, according to an example embodiment.

Figure 5:
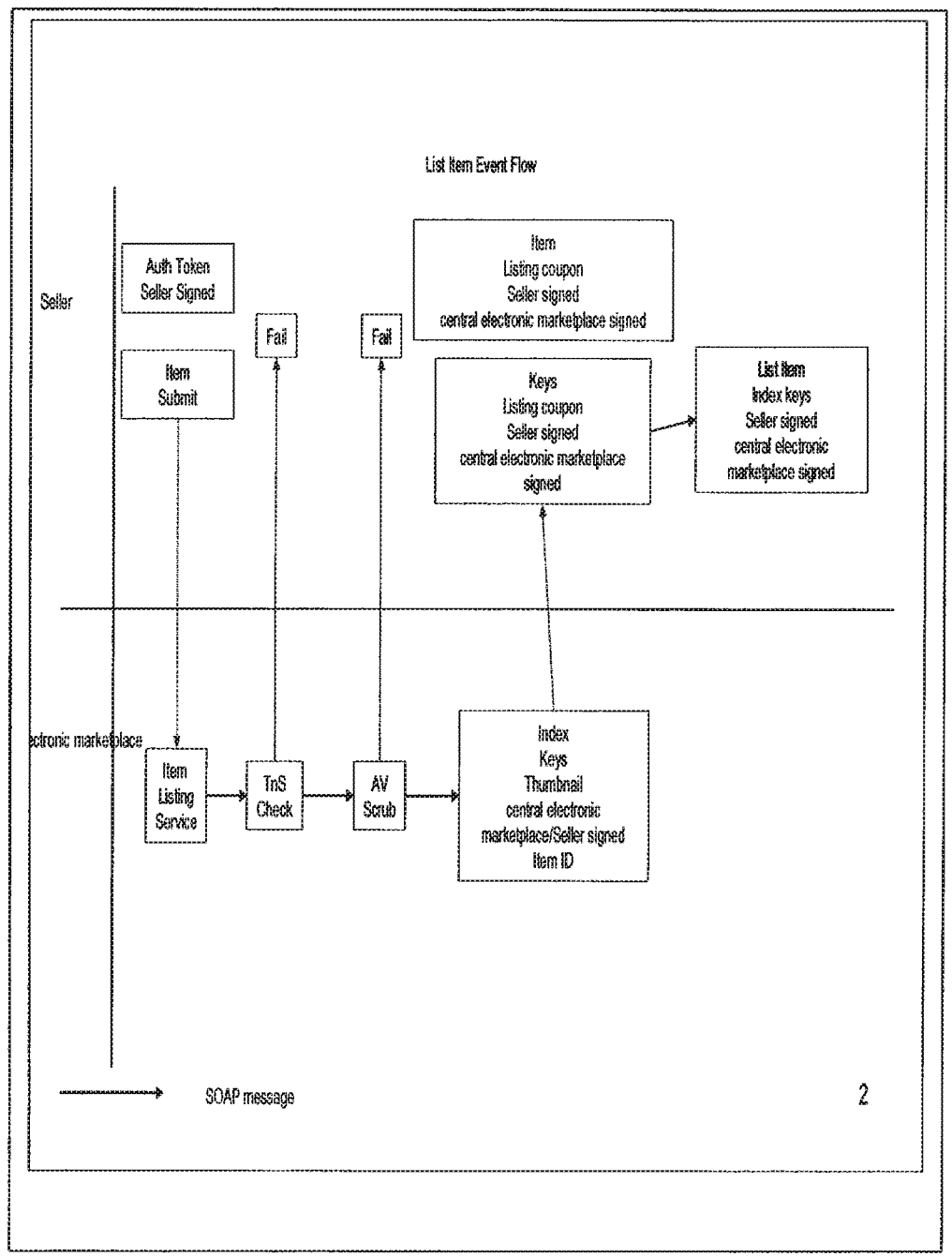
FIG. 5 illustrates a list item event flow, according to an example embodiment.

FIG. 5 illustrates a list item event flow, according to an example embodiment.

FIG. 6 illustrates an item search/retrieval process from the buyer perspective, according to an example embodiment.

Figure 7:
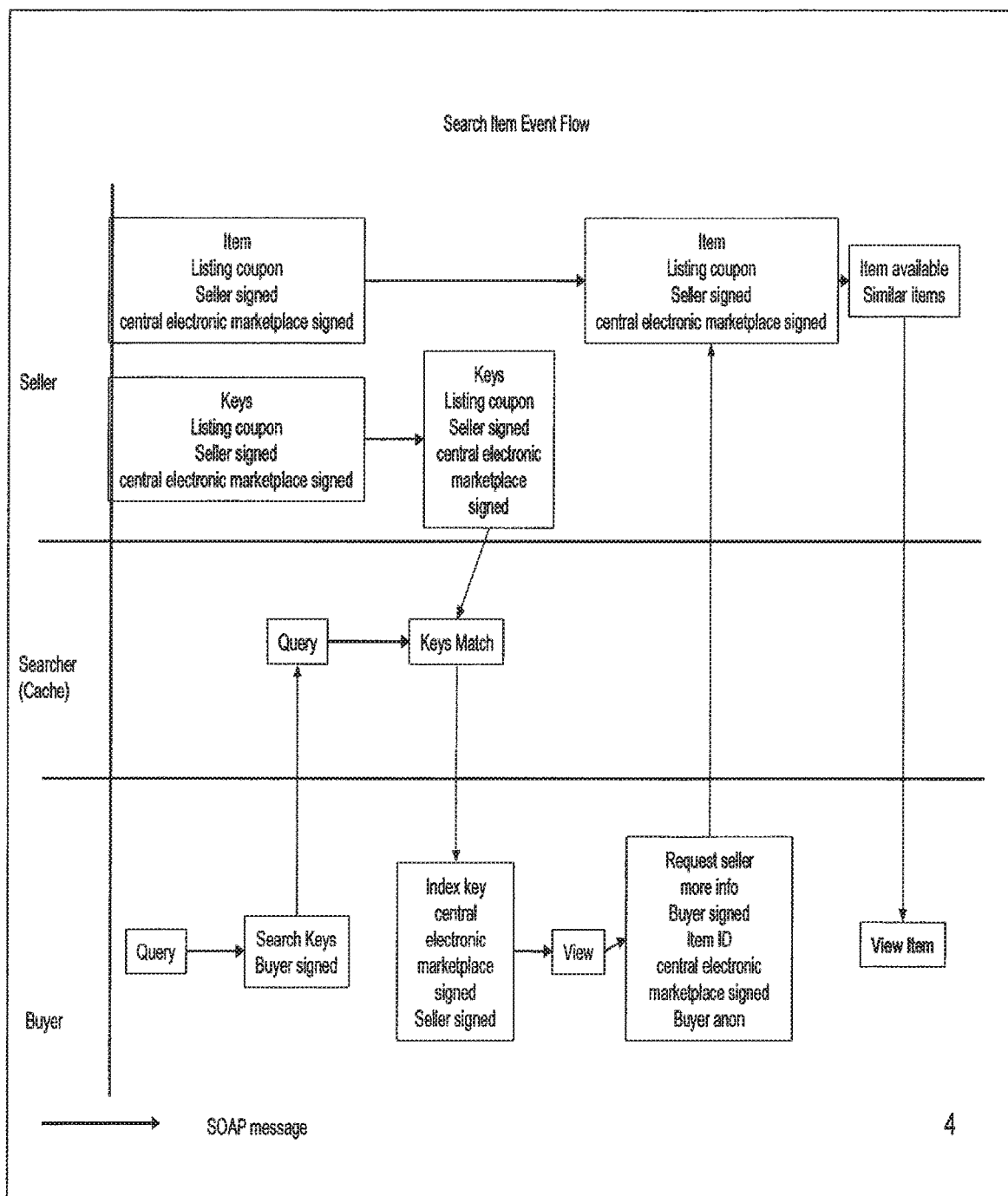
FIG. 7 illustrates a search item event flow, according to an example embodiment.

FIG. 7 illustrates a search item event flow, according to an example embodiment.

Figure 8:
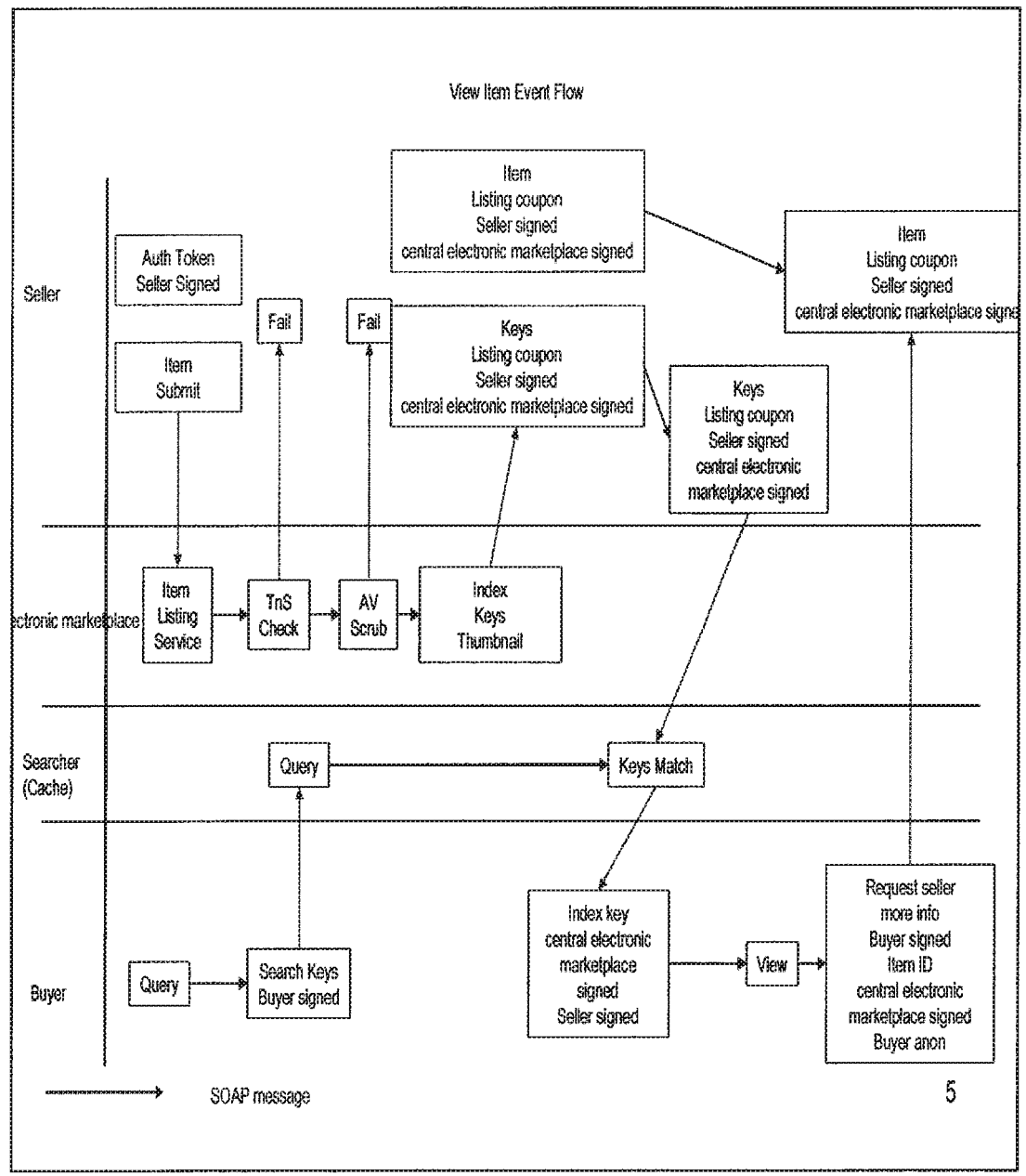
FIG. 8 illustrates a view item event flow, according to an example embodiment.

FIG. 8 illustrates a view item event flow, according to an example embodiment.

Figure 9:
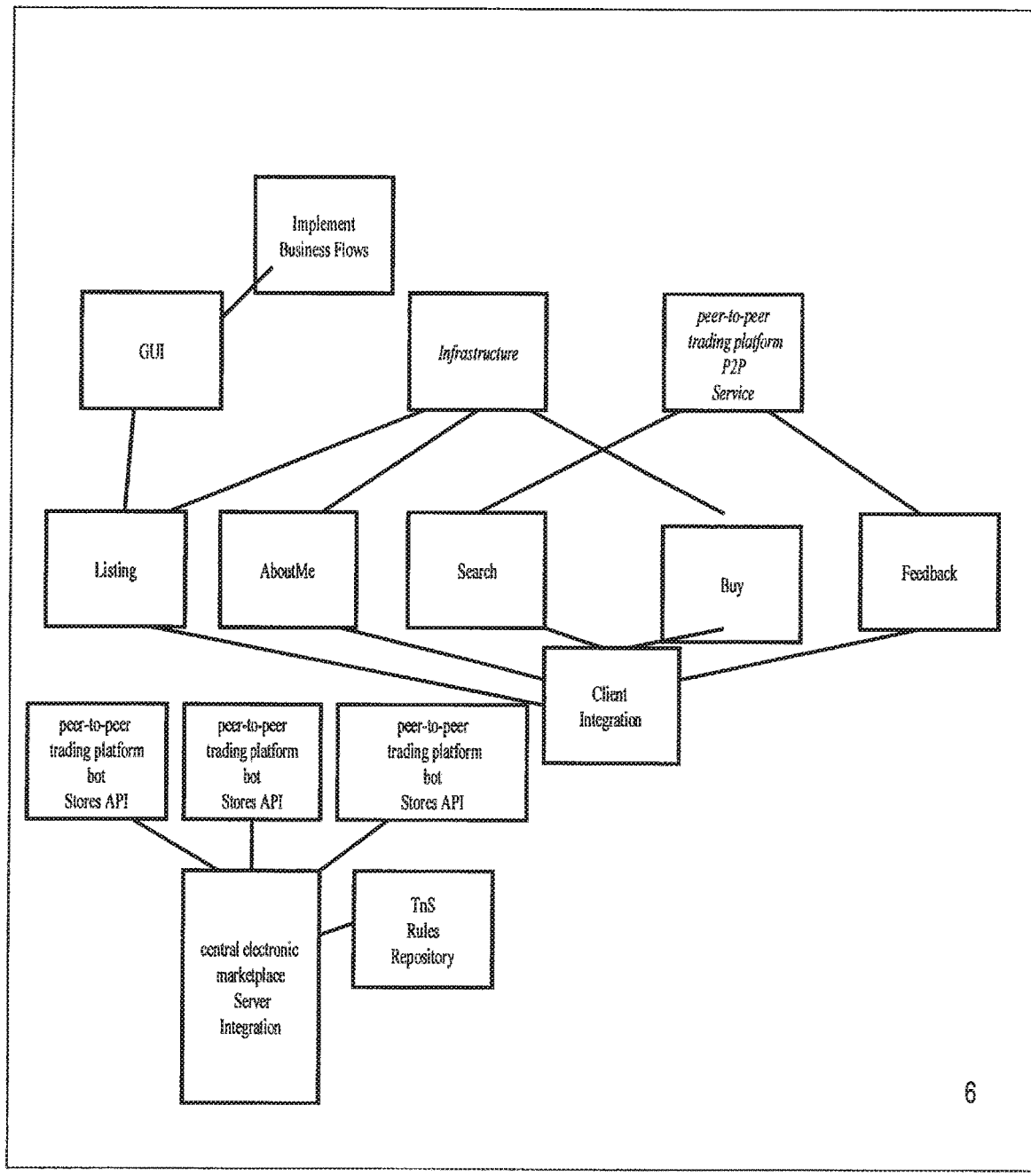
FIG. 9 illustrates an interconnectivity diagram showing the connections between functional components of an implementation, according to an example embodiment.

FIG. 9 illustrates an interconnectivity diagram showing the connections between functional components of an implementation, according to an example embodiment.

Figure 10:
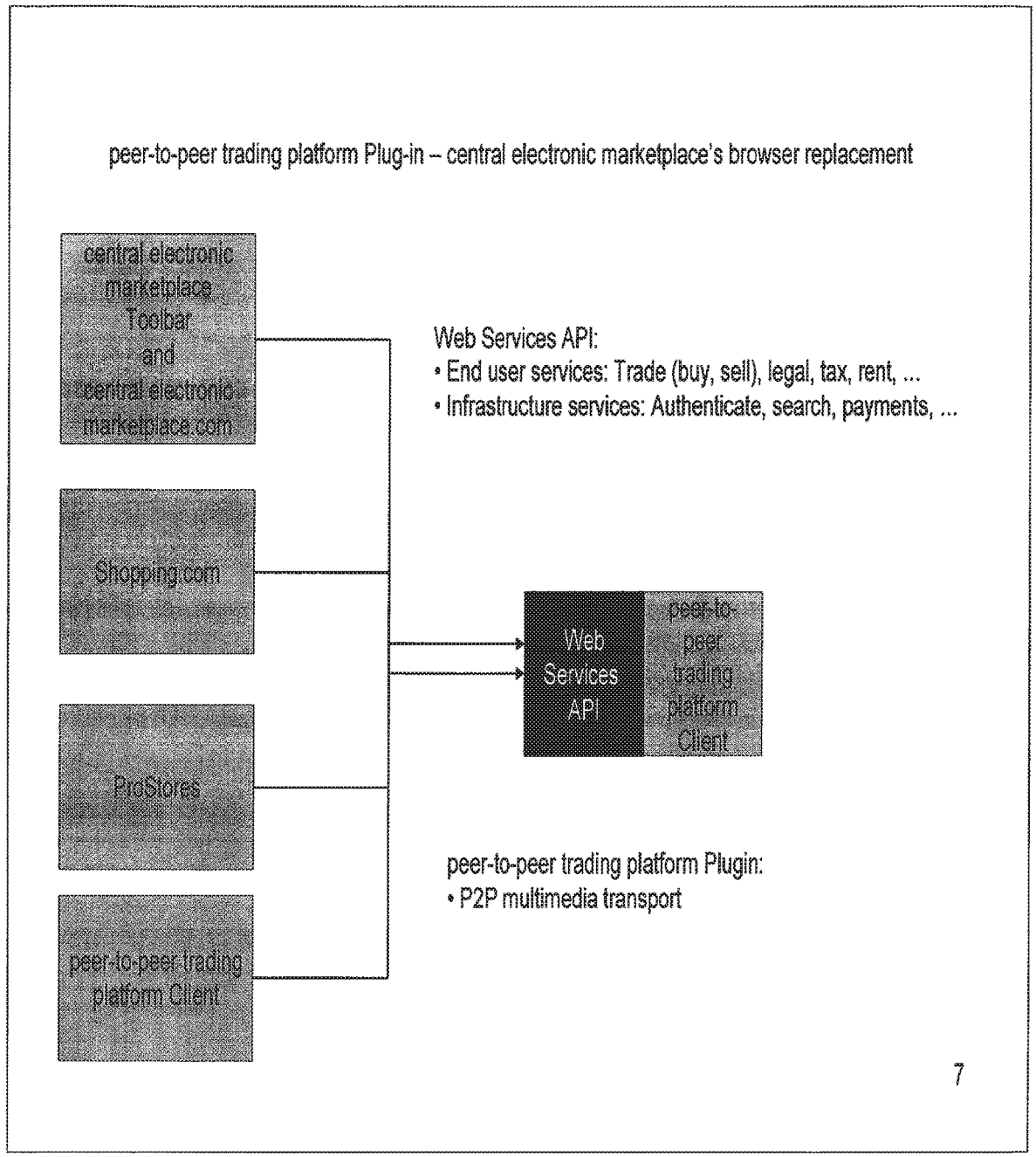
FIG. 10 illustrates a peer-to-peer trading platform plug-in that may replace a central e-commerce browser, according to an example embodiment.

FIG. 10 illustrates a peer-to-peer trading platform plug-in that may replace a central e-commerce browser, according to an example embodiment.

Figure 11:
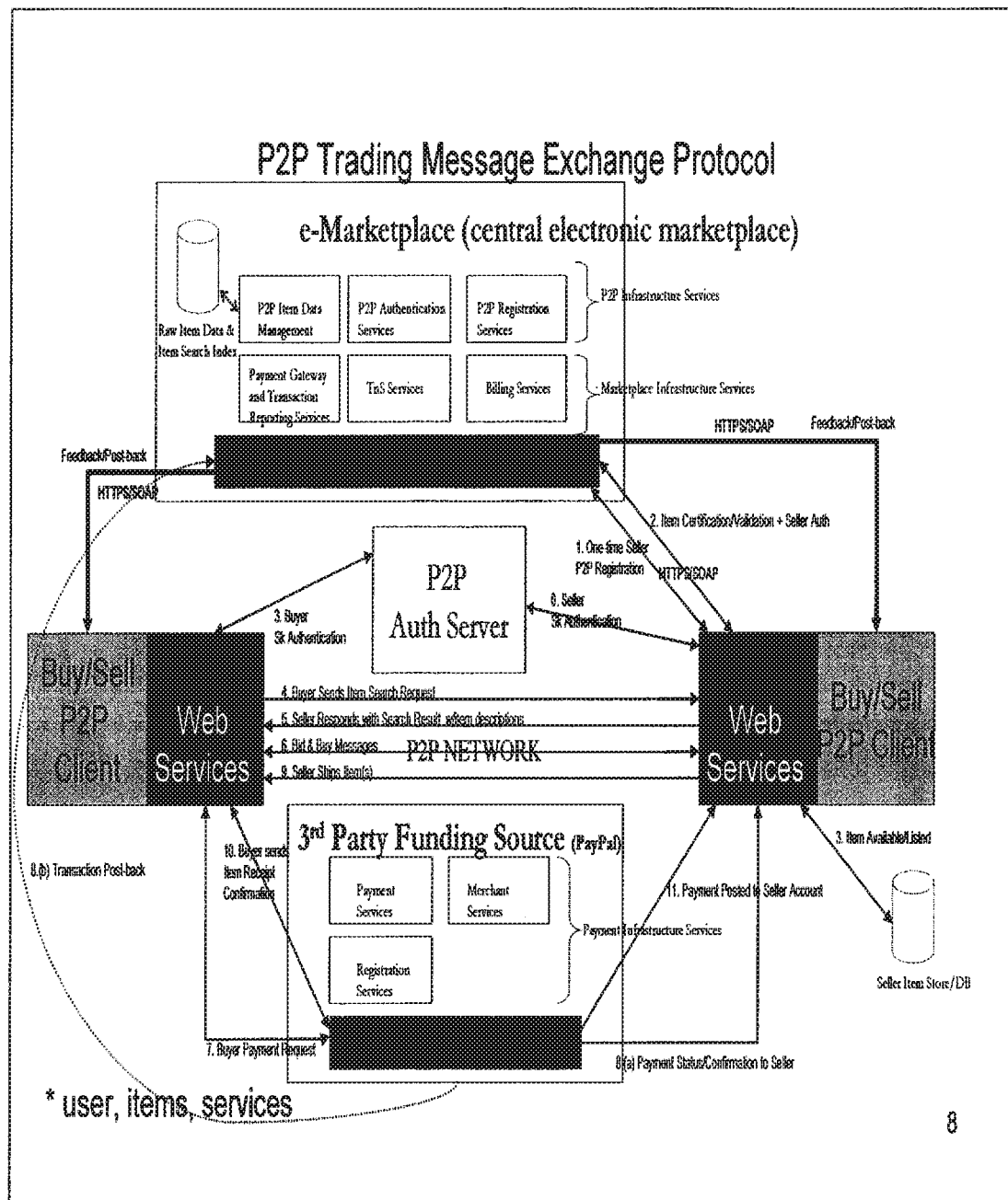
FIG. 11 illustrates a P2P trading platform message exchange protocol, according to an example embodiment.

FIG. 11 illustrates a P2P trading platform message exchange protocol, according to an example embodiment.

Figure 12:
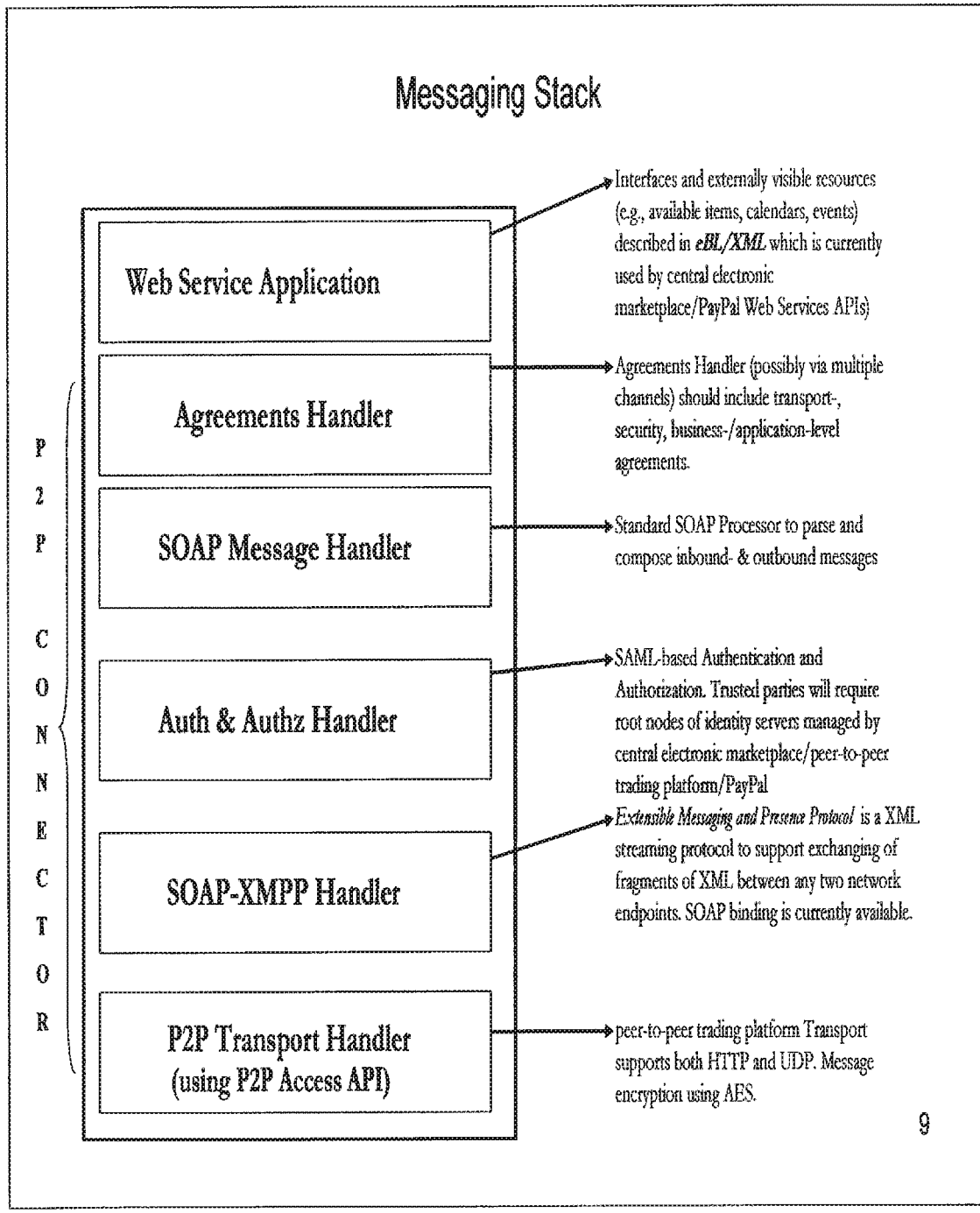
FIG. 12 illustrates a messaging stack, according to an example embodiment.

FIG. 12 illustrates a messaging stack, according to an example embodiment.

Figure 13:
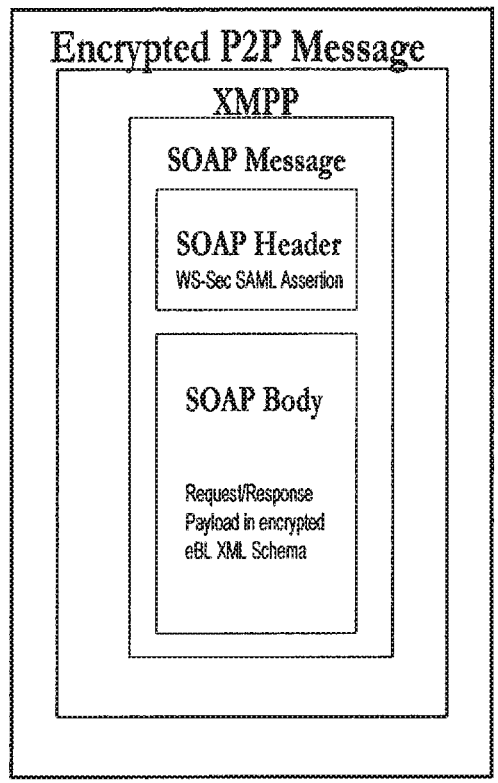
FIG. 13 illustrates a message format, according to an example embodiment.
Figure 14:
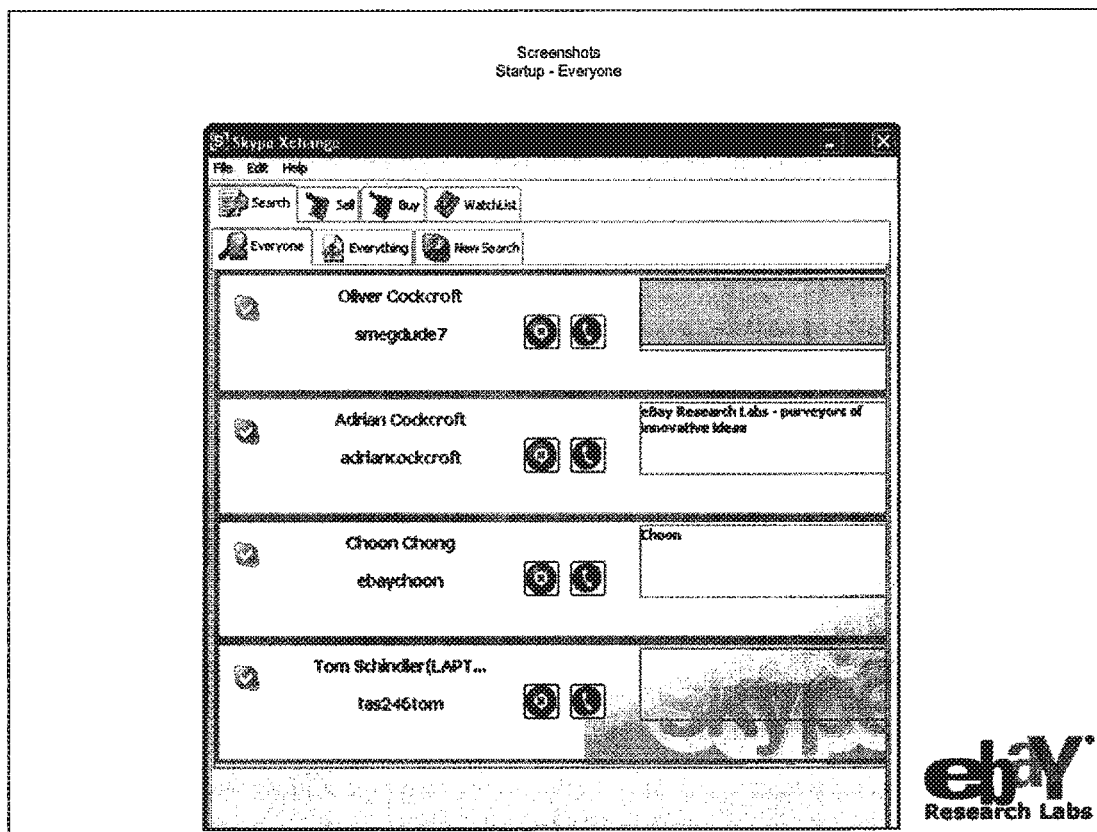
FIGS. 14-25 illustrate various user interface screen snapshots, according to an example embodiment.
Figure 15:
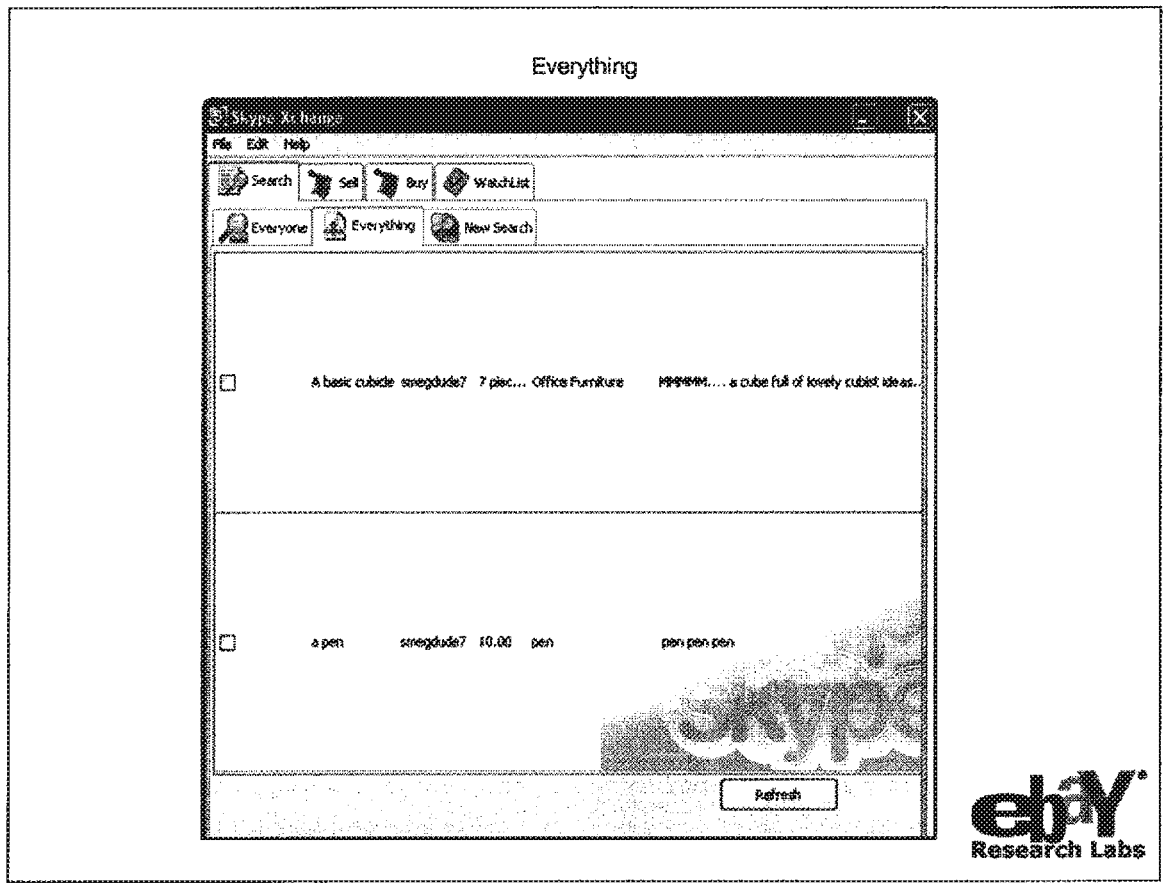
Figure 16:
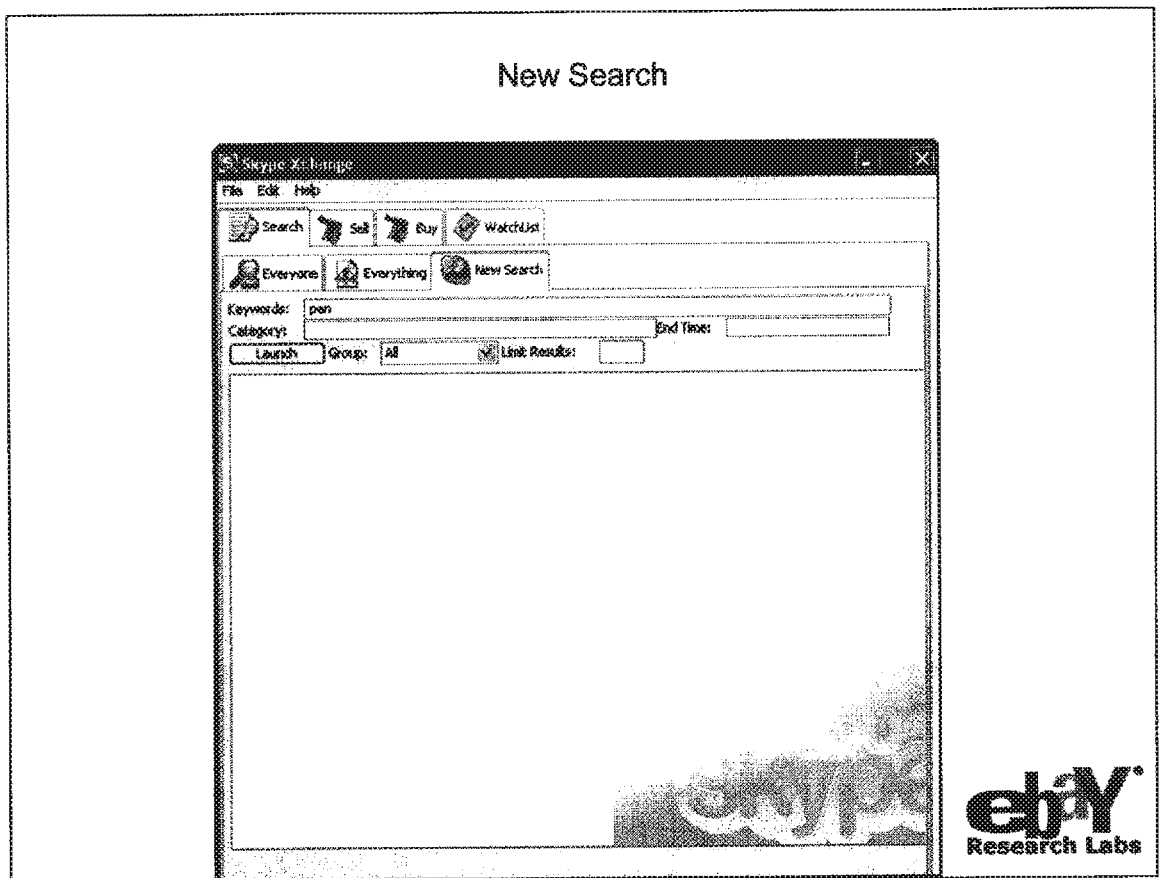
Figure 17:
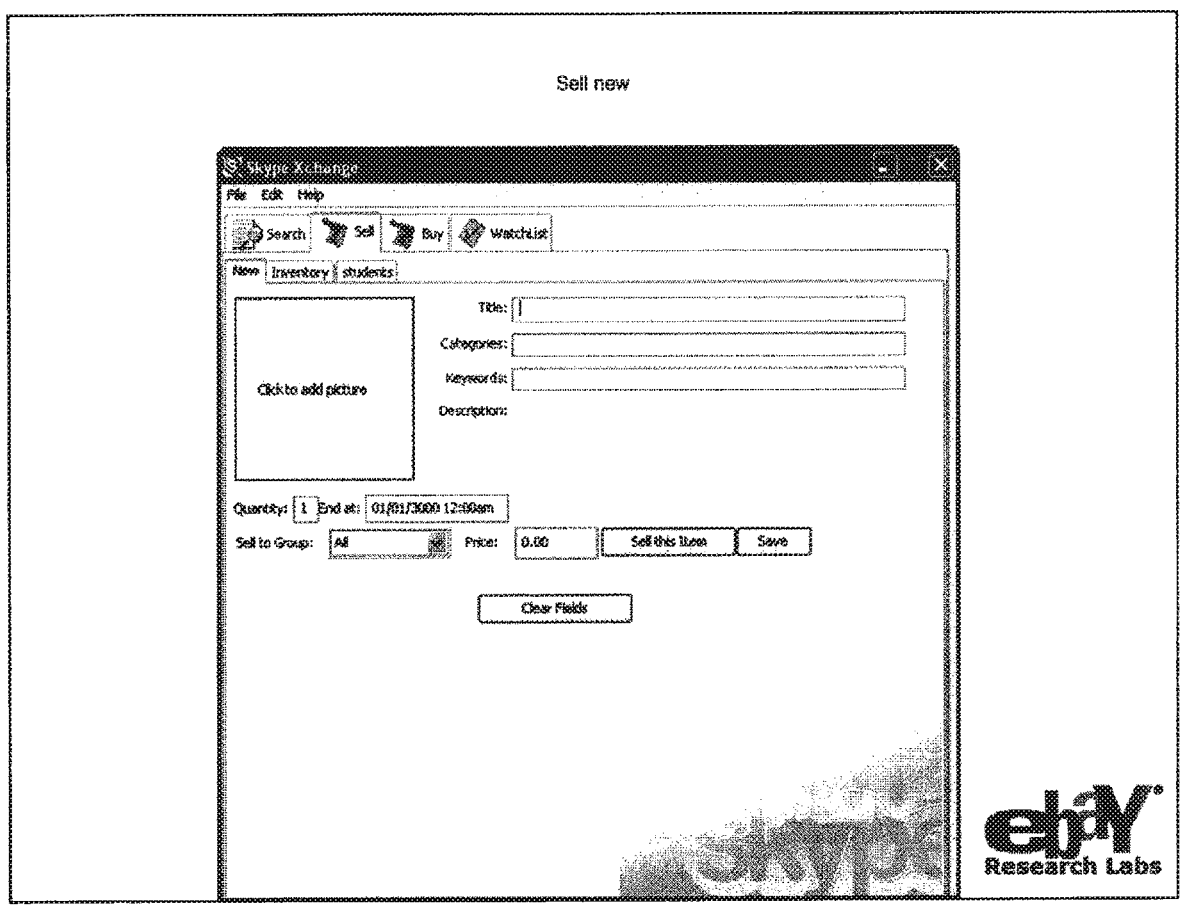
Figure 18:
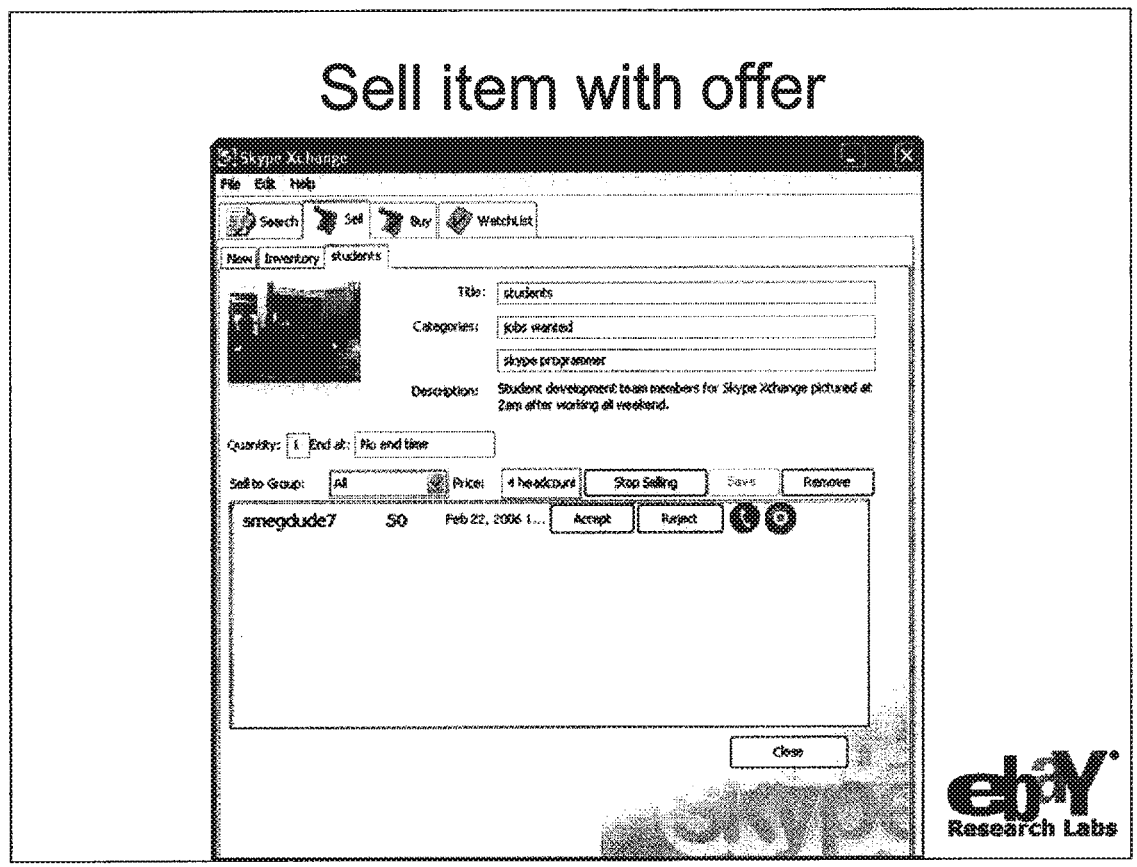
Figure 19:
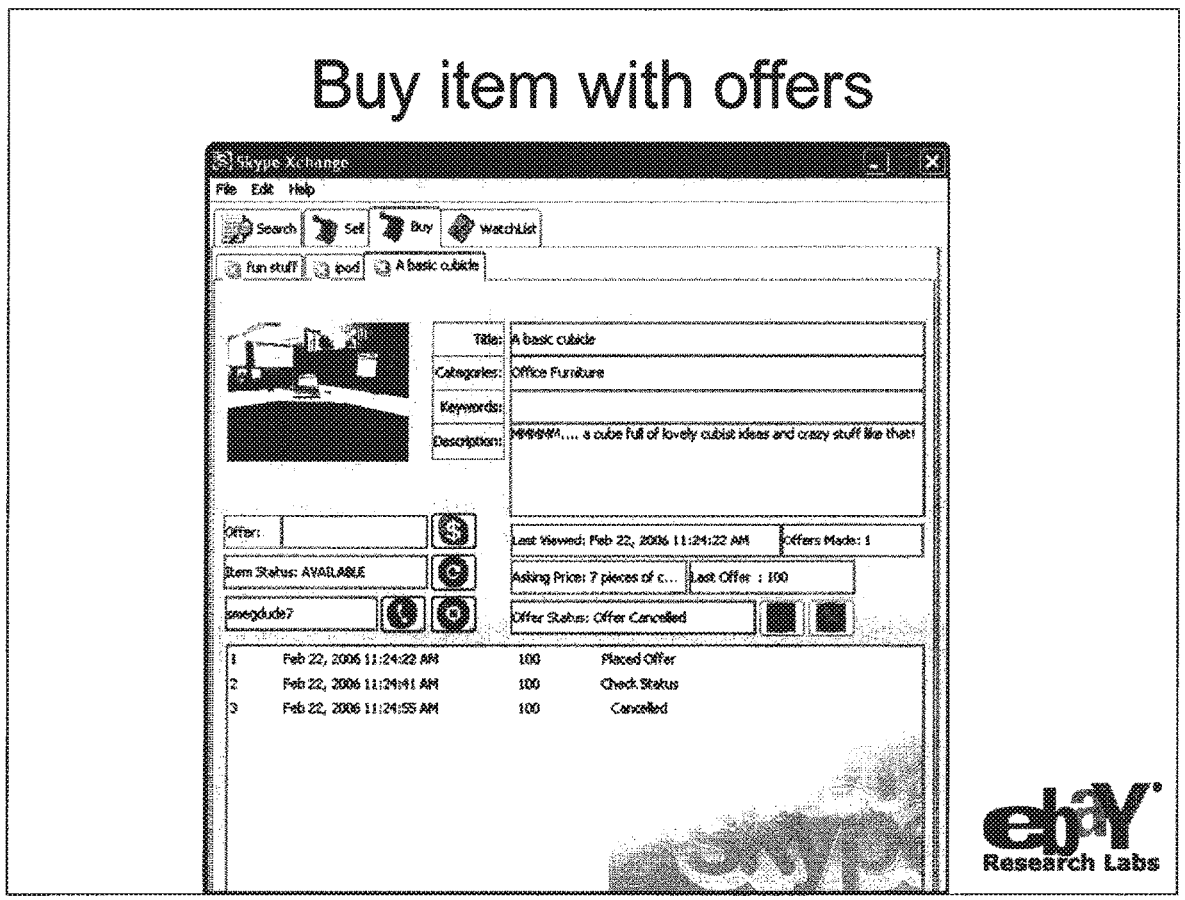
Figure 20:
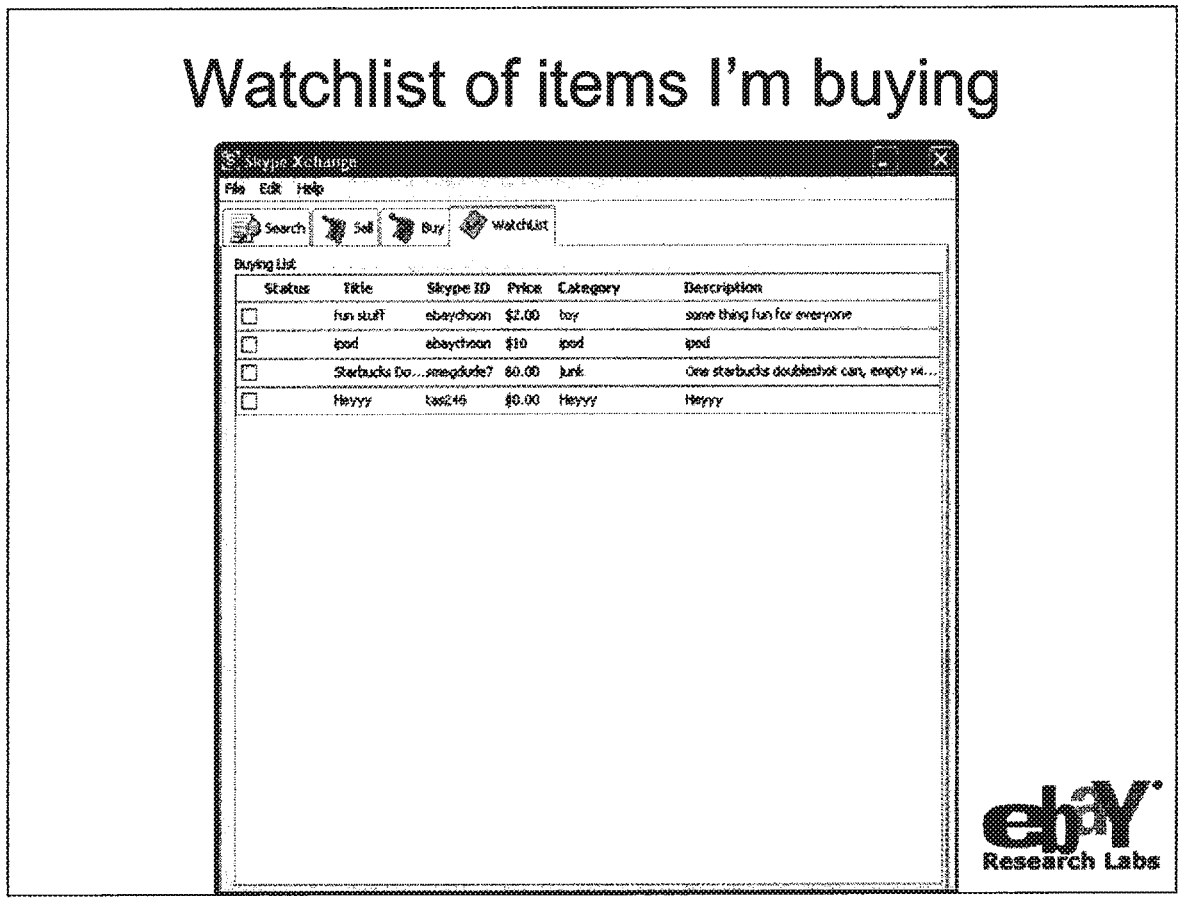
Figure 21:
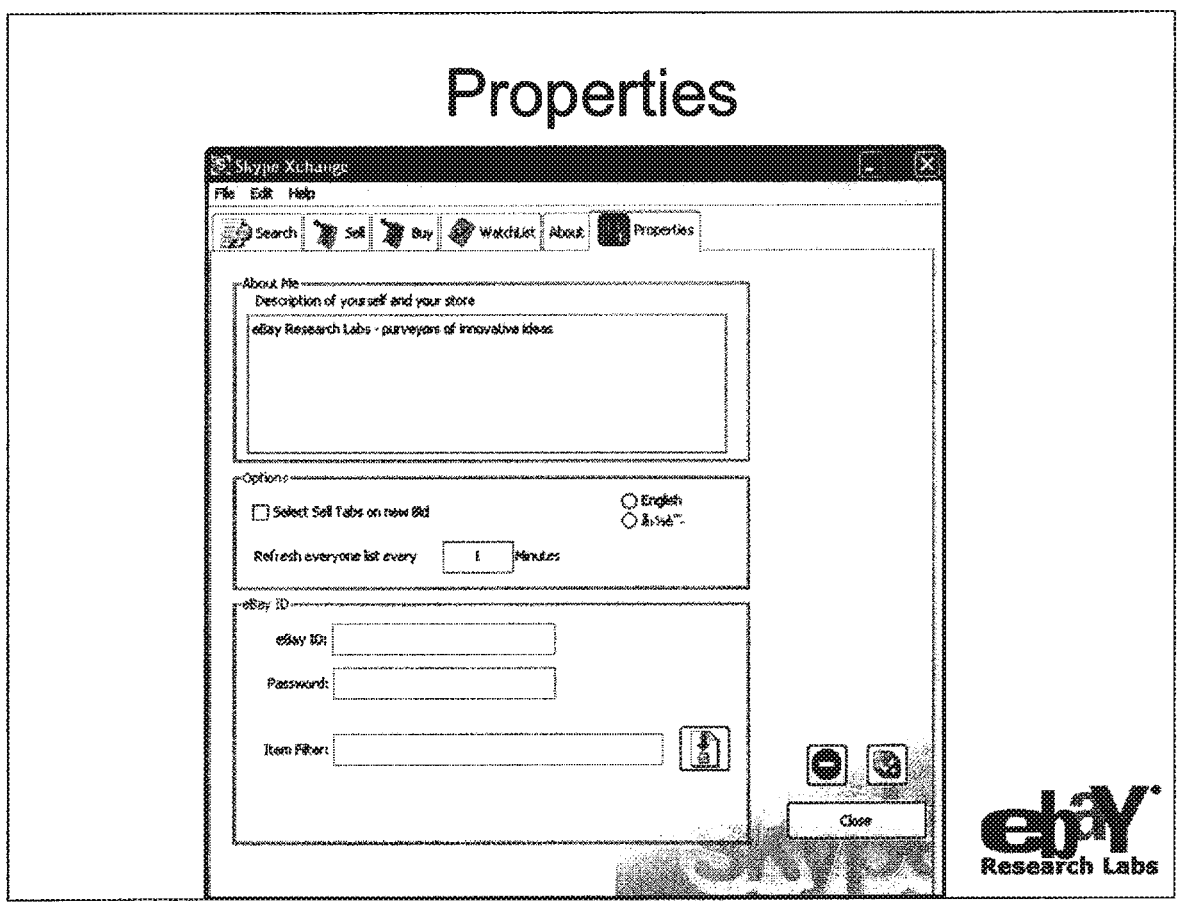
Figure 22:
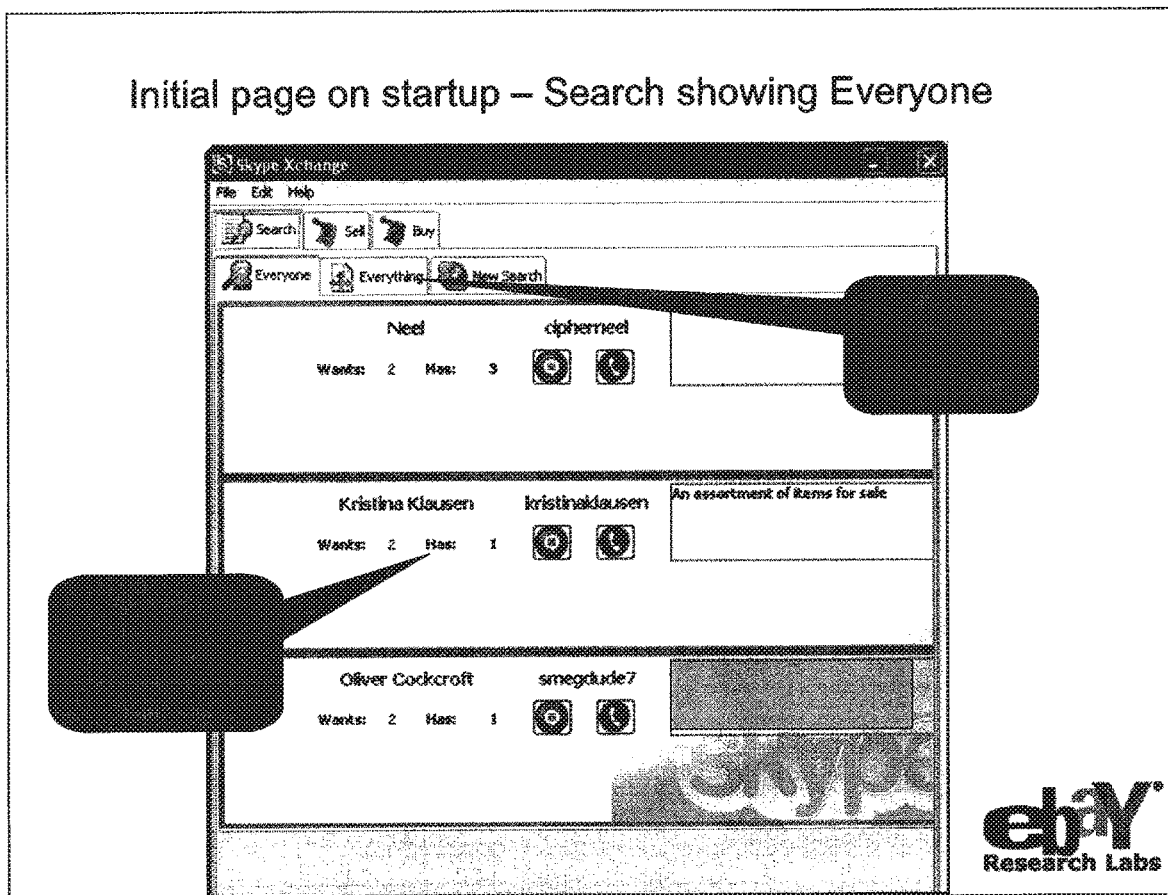
Figure 23:
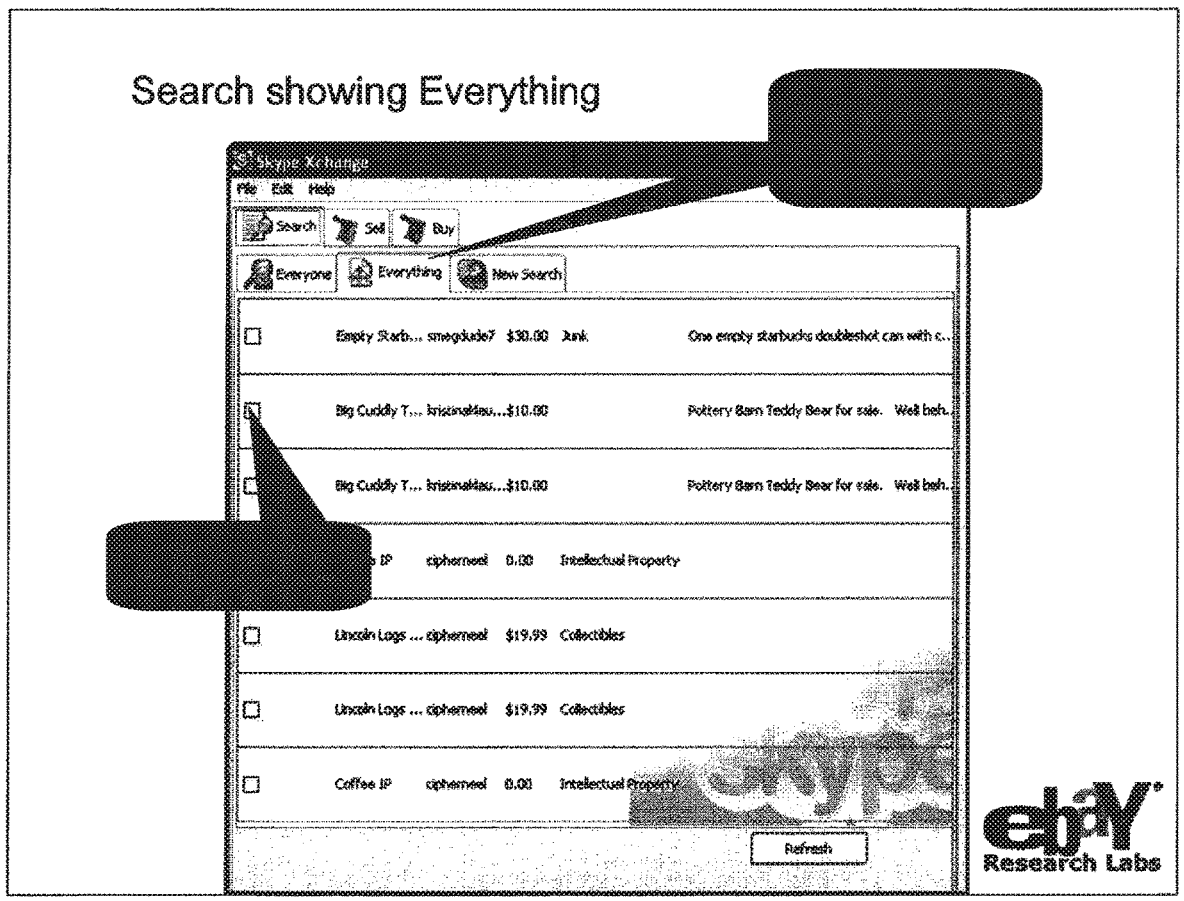
Figure 24:
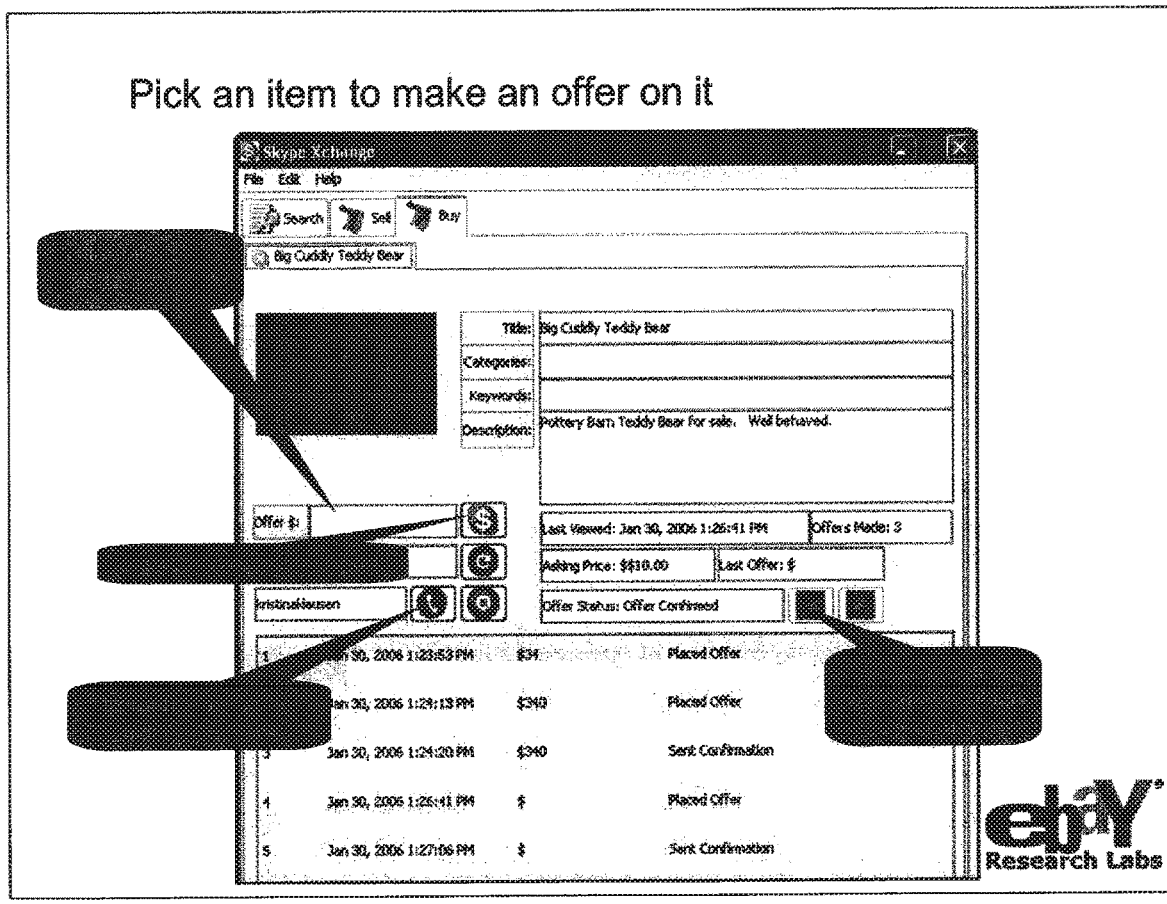
Figure 25:
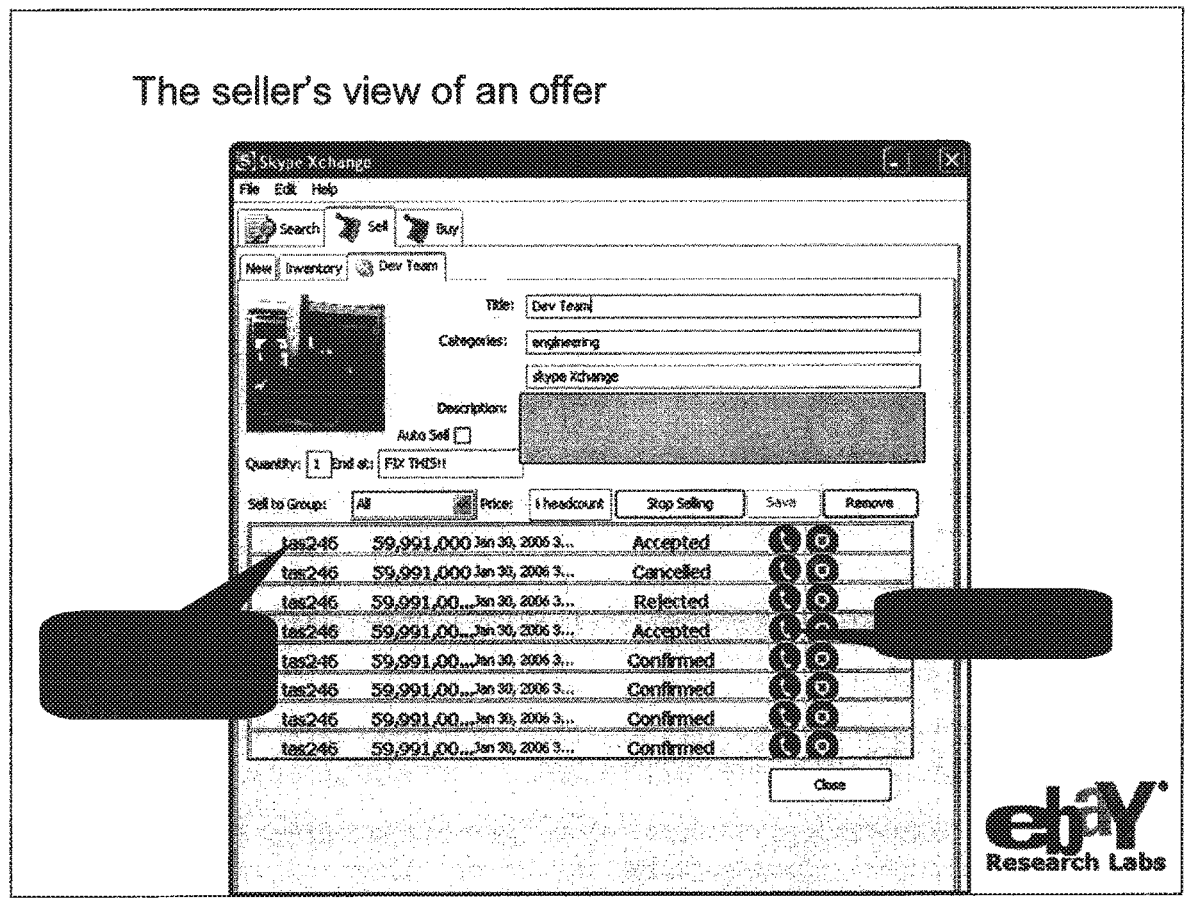

FIG. 13 illustrates a message format, according to an example embodiment.

A number of the user interfaces, according to an example embodiment, which may be presented by a peer-to-peer trading platform client application, are depicted in FIGS. 14-25. FIGS. 14-25 illustrate various user interface screen snapshots, according to an example embodiment.

Figure 26:
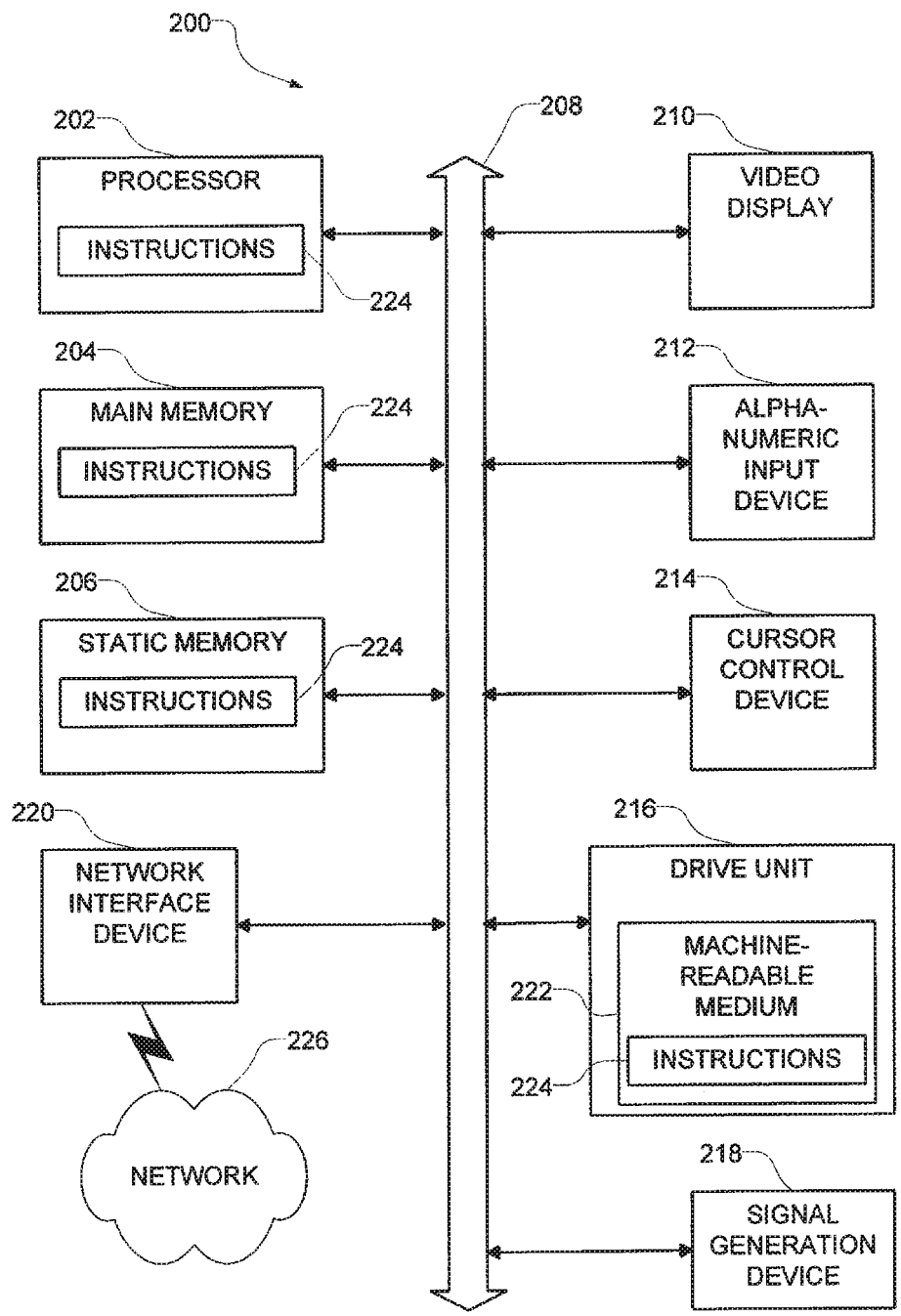
FIG. 26 shows a diagrammatic representation of machine in the example form of a computer system within which a set of instructions, for causing the machine to perform any one or more of the methodologies discussed herein, may be executed.

FIG. 26 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 204 and a static memory 206, which communicate with each other via a bus 208, The computer system 200 may further include a video display unit 210 (e.g., a liquid crystal display (LCD) or a cathode ray tube (CRT)), The computer system 200 also includes an alphanumeric input device 212 (e.g., a keyboard), a user interface (UI) navigation device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions and data structures (e.g., software 224) embodying or utilized by any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220 utilizing any one of a number of well-known transfer protocols (e.g., HTTP).

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
executing a first peer-to-peer node application operating as a client for a first set of operations and as a server for a second set of operations, the first peer-to-peer node application including a first interface component to display a plurality of items offered for sale and a first provider component configured to communicate listing and transaction data;
storing, by the first peer-to-peer node application, user account information for a user;
storing, by the first peer-to-peer node application, item information describing an item offered for sale; and
receiving a control option, by the first interface component of the first peer-to-peer node application, to accept or reject a sale or purchase of the item offered for sale;
receiving a query at the first provider component of the first peer-to-peer node application, the query received from a second peer-to-peer node application, the second peer-to-peer node application also operating as a client for the first set of operations and as the server for the second set of operations; and
sending the item information from the first peer-to-peer node application to the second peer-to-peer node application, the second peer-to-peer node application including a second interface component to display the item information and a second provider component configured to communicate the listing and transaction data to another peer-to-peer node.

2. The method of claim 1, wherein the user account information stored by the first peer-to-peer node application includes a role of the user.

3. The method of claim 2, wherein the role of the user is as an authorizer for the transaction.

4. The method of claim 2, wherein the role of the user is as a seller for the transaction, and a signature by the seller is stored by the first peer-to-peer node application.

5. The method of claim 1, wherein the stored item data is encrypted.

6. The method of claim 5, wherein a listing based on the stored item data is encrypted.

7. The method of claim 1, wherein the first provider component is further configured to communicate the item information to a trusted peer-to-peer node.

8. The method of claim 1, wherein the first provider component communicates reputation information about a second user account based on the transaction.

9. A non-transitory machine-readable storage medium storing instructions that, when executed by one or more processors of a machine, cause the machine to perform operations comprising:
executing a first peer-to-peer node application operating as a client for a first set of operations and as a server for a second set of operations, the first peer-to-peer node application including a first interface component to display a plurality of items offered for sale and a first provider component configured to communicate listing and transaction data;
storing, by the first peer-to-peer node application, user account information for a user;
storing, by the first peer-to-peer node application, item information describing an item offered for sale; and
receiving a control option, by the first peer-to-peer node application, to accept or reject a sale or purchase of the item offered for sale;
receiving a query at the first provider component of the first peer-to-peer node application, the query received from a second peer-to-peer node application, the second peer-to-peer node application also operating as a client for the first set of operations and as the server for the second set of operations; and
sending the item information from the first peer-to-peer node application to the second peer-to-peer node application, the second peer-to-peer node application including a second interface component to display the item information and a second provider component configured to communicate the listing and transaction data to another peer-to-peer node.

10. The non-transitory machine-readable storage medium of claim 9, wherein the user account information stored by the first peer-to-peer node application includes a role of the user.

11. The non-transitory machine-readable storage medium of claim 10, wherein the role of the user is as an authorizer for the transaction.

12. The non-transitory machine-readable storage medium of claim 10, wherein the role of the user is as a seller for the transaction, and a signature by the seller is stored by the first peer-to-peer node application.

13. The non-transitory machine-readable storage medium of claim 10, wherein the first provider component is further configured to communicate the item information to a trusted peer-to-peer node.

14. The non-transitory machine-readable storage medium of claim 10, wherein the first provider component communicates reputation information about a second user account based on the transaction.

15. A system comprising:
one or more hardware processors; and
a machine-readable storage medium storing instructions that, when executed by the one or more processors, cause the one or more hardware processors to perform operations comprising
executing a first peer-to-peer node application operating as a client for a first set of operations and as a server for a second set of operations, the first peer-to-peer node application including a first interface component to display a plurality of items offered for sale and a first provider component configured to communicate listing and transaction data;
storing, by the first peer-to-peer node application; user account information for a user;
storing, by the first peer-to-peer node application, item information describing an item offered for sale; and
receiving a control option, by the first peer-to-peer node application, to accept or reject a sale or purchase of the item offered for sale;
receiving a query at the first provider component of the first peer-to-peer node application, the query received from a second peer-to-peer node application, the second peer-to-peer node application also operating as a client for the first set of operations and as the server for the second set of operations; and sending the item information from the first peer-to-peer node application to the second peer-to-peer node application, the second peer-to-peer node application including a second interface component to display the item information and a second provider component configured to communicate the listing and transaction data to another peer-to-peer node.

16. The system of claim 15, wherein the user account information stored by the first peer-to-peer node application includes a role of the user.

17. The system of claim 16, wherein the role of the user is as an authorizer for the transaction.

18. The system of claim 16, wherein the role of the user is as a seller for the transaction, and a signature by the seller is stored by the first peer-to-peer node application.

19. The system of claim 15, wherein the first provider component communicates reputation information about a second user account based on the transaction.

* * * * *